(12) United States Patent
Ma

(10) Patent No.: US 12,473,985 B2
(45) Date of Patent: Nov. 18, 2025

(54) VALVE CORE AND A PULL-OUT FAUCET THEREOF

(71) Applicant: Ningbo Wanhai Cartridge Technology Co., Ltd., Zhejiang (CN)

(72) Inventor: Yonghua Ma, Zhejiang (CN)

(73) Assignee: Ningbo Wanhai Cartridge Technology Co., Ltd., Ningbo (CN)

( * ) Notice: Subject to any disclaimer, the term of this patent is extended or adjusted under 35 U.S.C. 154(b) by 295 days.

(21) Appl. No.: 18/452,694

(22) Filed: Aug. 21, 2023

(65) Prior Publication Data

US 2024/0102562 A1 Mar. 28, 2024

(30) Foreign Application Priority Data

Sep. 27, 2022 (CN) .......................... 202222569325.4
Apr. 28, 2023 (CN) .......................... 202321067255.0

(51) Int. Cl.
*F16K 11/074* (2006.01)
*E03C 1/04* (2006.01)

(52) U.S. Cl.
CPC ............ *F16K 11/0743* (2013.01); *E03C 1/04* (2013.01); *Y10T 137/9464* (2015.04)

(58) Field of Classification Search
CPC ............... F16K 11/0787; F16K 27/045; F16K 11/0785; Y10T 137/9464; Y10T 137/86525
USPC ........................................................ 137/801
See application file for complete search history.

(56) References Cited

U.S. PATENT DOCUMENTS

| 5,752,541 | A  | * | 5/1998  | Gonzalez ................ F16K 11/02 |
|           |    |   |         | 137/454.2                           |
| 10,167,963 | B1 | * | 1/2019  | Chang .................... F16K 11/072 |
| 10,209,722 | B2 | * | 2/2019  | Pirutin .................. E03C 1/0404 |
| 10,738,899 | B2 | * | 8/2020  | Chang .................... E03C 1/025 |
| 12,098,773 | B2 | * | 9/2024  | Ma ........................ F16K 27/044 |
| 12,116,258 | B2 | * | 10/2024 | Wu ........................ E03C 1/046 |
| 12,239,278 | B2 | * | 3/2025  | Cipriani .................. A47L 17/02 |
| 2009/0139589 | A1 | * | 6/2009  | Di Nunzio .......... F16K 11/0787 |
|           |    |   |         | 137/625.46                          |
| 2016/0145119 | A1 | * | 5/2016  | Wang ........................ F16K 1/42 |
|           |    |   |         | 210/435                             |

(Continued)

*Primary Examiner* — Daphne M Barry
(74) *Attorney, Agent, or Firm* — Wang Law Firm, Inc.

(57) ABSTRACT

The present invention relates to a valve core. The valve core comprises a valve housing, a valve handle, a rotor, a driving plate, a movable valve sheet and a fixed valve sheet. The driving plate is disposed on the bottom of the rotor, the movable valve sheet disposed inside the valve housing and below the driving plate; the fixed valve sheet disposed inside the valve housing and located at the bottom of the valve housing. The driving plate has a limiting portion; the valve housing has two inner blocks. Only when the limiting portion is aligned with the limiting recess, the movable valve sheet is capable of sliding with the driving plate in a direction of closing inlet water, when the limiting portion is exposed to a periphery of the rotor, the limiting portion inserts into the limiting recess; and when the driving plate rotates in a state where the limiting portion and the limiting recess are misaligned, the limiting portion is blocked by the inner blocks, so as to stop the movable valve sheet from sliding with the driving plate in a direction of closing inlet water. The present invention also relates to a pull-out faucet.

14 Claims, 22 Drawing Sheets

(56) References Cited

U.S. PATENT DOCUMENTS

2024/0068214 A1* 2/2024 Zhang .................... E03C 1/057

* cited by examiner

VALVE CORE AND A PULL-OUT FAUCET THEREOF

TECHNICAL FIELD OF THE INVENTION

The present invention relates to a field of a valve core of a faucet, and in particular to a valve core which is capable of mixing water (controlling the opening or closing of water inlet channels and adjusting the water temperature) and distributing water (distributing water outlet channels of the water flow) and a pull-out faucet thereof.

BACKGROUND OF THE INVENTION

Faucet valve cores can be functionally classified into two categories. One category is water mixing valve cores, which are used to control the opening and closing of water inlet channels of cold water and hot water and adjust the water temperature, and some of which can also adjust the water volume. The other category is water distribution valve cores, which can control the flow direction of water and distribute the water outlet channels of the water flow. Due to the functional limitations of the two types of valve cores, in the sanitary industry, the two categories of valve cores are often used together to realize the functions of water distribution, water temperature adjustment and flow adjustment. Under this design, one more valve core needs to be used, and two types of valve cores are both arranged in the faucet body, so that the faucet body is complex in structure, large in size, wasteful of copper materials, and difficult to process. For example, a Chinese patent CN203718041U (patent No.: CN201320478247.5) disclosed "a shower faucet" with a faucet mechanism using two types of valve cores.

Depending on different spray systems, the water distribution valve cores are classified into two-channel water distribution (the shower and the faucet) and three-channel water distribution (the shower, the top shower and the faucet). At present, there are faucet valve cores that combine the functions of the two valve cores. For example, a Chinese patent CN102644766A (patent No.: CN201210101026.6) disclosed "a multifunctional ceramic valve core being capable of water distribution and water mixing". The ceramic valve core comprises a housing and a base. A driving rod, a ceramic movable sheet clamped and fixed on a driving plate, and a ceramic stationary sheet clamped on the base are successively disposed inside the housing from top to bottom; an upper end of the driving rod extends out of the top of the housing, and a middle portion thereof is arranged in a bracket and pivoted to the bracket through a fulcrum shaft fixed on the bracket; the lower end of the bracket is connected to the driving plate; the tail end of the driving rod is connected to the driving plate and drives the driving plate to slide along the bracket in the rotation direction of the driving rod; a first water inlet, a second water inlet, a first water outlet and a second water outlet that are spaced apart from each other are formed on the base, and the ceramic stationary sheet has first, second, third and fourth flow channels corresponding to the first water inlet, the second water inlet, the first water outlet and the second water outlet; the top end of the ceramic moving sheet is sealed, the middle portion of the bottom end thereof is recessed inward to form a mixed flow chamber for communicating the water inlet and the water outlet, and the end face of the bottom end attaches to the top of the ceramic stationary sheet to form a switching surface for switching the flow direction and improving flow rate of inlet water and outlet water.

In the above patent, the closure of the first and second water outlets or the selective channels of the first and second water outlets is realized by only the ceramic movable sheet, that is, only one of the first and second water outlets can allow water to pass, or neither of the first nor second water outlets can allow water to pass. In addition, the ceramic movable sheet is selectively communicated with the first or second water outlet through the mixed flow chamber to realize the water distribution.

SUMMARY OF THE INVENTION

It is a first object of the present invention to provide a valve core which is reasonable and compact in structure. The valve core can realize water mixing (controlling the opening or closing of the water inlet channels, and adjusting the water temperature) by the rotation of a valve handle and realize water distribution (distributing water outlet channels of the water flow) by the swinging of the valve handle, and the valve handle can swing only when the valve handle is at the initial position (does not rotate at a certain degree), so as to close the water outlet channels.

For achieving the first object, the valve core comprises a valve housing having a chamber, an inner top surface, a bottom and two water inlet channels and two water outlet channels; a rotor disposed inside the valve housing; a driving plate disposed inside the valve housing and below the rotor; a valve handle disposed inside the valve housing and being capable of rotating and swinging; a movable valve sheet disposed inside the valve housing and below the driving plate; a fixed valve sheet disposed inside the valve housing and located at the bottom of the valve housing. The rotation of the valve handle can drive the rotor and the driving plate to rotate, and the swinging of the valve handle can drive the driving plate to move. The driving plate is rotatable together with the rotor under the rotation of the valve handle and is slidable relative to the rotor under the swinging of the valve handle, the driving plate has a limiting portion protruding at a periphery of the driving plate. The movable valve sheet is connected to the driving plate and is rotatable and slidable together with the driving plate, the rotation of the movable valve sheet is used for adjusting a mixing ratio of cold water to hot water, the sliding of the movable valve sheet is used for switching the two water outlet channels and closing the two water inlet channels. The valve housing has two inner blocks protruding from the inner top surface of the valve housing and being spaced to form a limiting recess between the two inner blocks for receiving and limiting the limiting portion of the driving plate; only when the limiting portion is aligned with the limiting recess, the movable valve sheet is capable of sliding with the driving plate in a direction of closing inlet water, when the limiting portion is exposed to a periphery of the rotor, the limiting portion inserts into the limiting recess; and when the driving plate rotates in a state where the limiting portion and the limiting recess are misaligned, the limiting portion is blocked by the inner blocks, so as to stop the movable valve sheet from sliding with the driving plate in a direction of closing inlet water.

As a specific arrangement mode of channels in the valve core, the two water inlet channels comprise a cold water inlet channel, a hot water inlet channel formed on the fixed valve sheet and the bottom of the valve housing correspondingly, and the two water outlet channels comprise a first water outlet channel and a second water outlet channel formed on the fixed valve sheet and the bottom of the valve housing correspondingly; the movable valve sheet has a mixed water chamber, the rotation of the movable valve sheet adjusts the area of the mixed water chamber which overlaps with the cold water channel and the hot water channel, the sliding of the movable valve sheet selects whether the mixed water chamber communicates with the first water outlet channel or with the second water outlet channel, the sliding of the movable valve sheet also determines whether the movable valve sheet blocks the cold water channel and the hot water channel or not. Generally, two water outlet channels are optimal. Of course, more water outlet channels may be designed. The movable valve sheet blocks the cold water channel and the hot water channel. At this time, neither the first water outlet channel nor the second water outlet channel discharges water, unlike the conventional way of blocking the first water outlet channel and the second water outlet channel, so that it is more advantageous for layout.

To ensure that no water flows out of the first water outlet channel when the movable valve sheet is moved to the water outlet position of the second water outlet channel, the area of the first water outlet channel to be blocked is relatively large, so that the cross section of the first water outlet channel needs be small in a limited layout space, resulting in too small water discharge of the first water outlet channel; or, the cover surface of the movable valve sheet needs be large, so it means that the valve core needs to be large. Either way, there are defects.

In view of the above situation, as a further improvement, the movable valve sheet has a first mixed water outlet and a second mixed water outlet that communicates with the mixed water chamber; the first mixed water outlet always communicates with the first water outlet channel; and, the movable valve sheet slides to determine whether the second mixed water outlet communicates with the second water outlet channel. Under this design, no matter when the movable valve sheet is moved and switched to which water outlet channel, there must be water flowing out of the first water outlet channel. The purpose of switching the water outlet position is that the second water outlet channel can be switched for water discharge when the solenoid valve for controlling the water discharge of the first water outlet channel is damaged. Generally, when the solenoid valve is damaged, it will always be in the closed position. At this time, even if water enters the first water outlet channel, it will not be affected. However, this solution does not consider that the first water outlet channel must be blocked when water is discharged from the second water outlet channel, the water outlet area of the first water outlet channel should be as large as possible in the case of a certain space, thereby ensuring a large water flow.

Preferably, when the movable valve sheet is located at an initial position, the mixed water chamber communicates with the cold water channel and the first water outlet channel but is closed to the hot water channel and the second water outlet channel; when the movable valve sheet slides toward the limiting recess from the initial position of the movable valve sheet, the movable valve sheet blocks both the cold water channel and the hot water channel, the mixed water chamber is closed to both the cold water channel and the hot water channel, and the limiting portion is inserted into the limiting recess; when the movable valve sheet slides opposite the limiting recess from the initial position of the movable valve sheet, the mixed water chamber communicates with the cold water channel and the second water outlet channel but is closed to the hot water channel. In the above layout, the valve core has three clear operation positions; and under this design, at the initial position of the movable valve sheet, the cold water outflows. That is, cold water is first discharged from the closed state to the opened state, thereby avoiding burning hands and being safer to use.

Preferably, the driving plate has a radial guide platform protruding upward from a top surface of the driving plate, the limiting portion is located at one end of the guide platform, the rotor has a guide groove for receiving the guide platform radially distributed at the bottom of the rotor, the guide platform is capable of sliding along the guide groove. The connection between the guide platform and the guide groove ensures that the movable valve sheet radially slides with the driving plate more smoothly.

Preferably, the guide platform has two side walls, two first columns partially exposed to the corresponding side wall of the guide platform are respectively disposed at one of the side walls of the guide platform; the rotor has two inner walls at the guide groove, two second columns partially exposed to the corresponding inner wall of the rotor are respectively disposed at one of the inner walls of the rotor; when the movable valve sheet slides with the driving plate, the guide platform slides along the guide groove, each first column needs to move past the corresponding second column, so as to move the movable valve sheet across the initial position of the movable valve sheet. The first columns and the second columns are partially staggered, and a certain force is required to allow the first columns to pass over the second columns. Under this design, a good hand feeling is obtained in the process of switching the water channel, and a certain force is required to drive the valve handle to enter another position from one position, thereby realizing good operation experience. In addition, the user is clearly indicated to switch the mode at which position.

Preferably, the movable valve sheet has a blocking wall at a bottom of the movable valve sheet, the first mixed water outlet is located at a center of the bottom of the movable valve sheet, the second mixed water outlet is separated from the first mixed water outlet by the blocking wall, and when the blocking wall covers the second water outlet channel, the second mixed water outlet is not in communication with the second water outlet channel when blocked by the blocking wall. This layout is advantageous for the sliding and rotation of the movable valve sheet to realize position switching.

Preferably, the driving plate is connected to a top of the movable valve sheet, a first sealing member is disposed between the driving plate and the movable valve sheet, the movable valve sheet has a concave cavity opening upward defined as the mixed water chamber. By arranging the concave cavity opening upward on the movable valve sheet, it is more convenient to process and form the movable valve sheet, and it is advantageous for the formation of the mixed water cavity.

Preferably, the first water outlet channel is located at a center of the bottom of the valve housing, the cold water channel, the hot water channel and the second water outlet channel surround the first water outlet channel. This layout is advantageous for the swinging and rotation of the movable valve sheet to realize position switching. The valve handle is capable of rotating with the rotor through a pin shaft running axially through a middle of the valve handle and the rotor; the driving plate has a concaved cavity on the top of the driving plate, the valve handle has a bottom end extending downward and being positioned inside the concaved cavity to drive the driving plate to slide. Under this design, the valve handle can drive the rotor, the driving plate and the movable valve sheet to rotate synchronously, and the swinging of the valve handle can also drive the driving plate and the movable valve sheet to slide radially relative to the rotor and the fixed valve sheet.

Preferably, the rotor has a limiting block protruding from the periphery of the rotor, and the limiting block is located between two inner blocks to limit a rotation angle of the rotor. This structure limits the rotation angle of the rotor. At one extreme angle position, the limiting block is matched with one inner boss, and the cold water channel completely communicates with the mixed water inlet; and, at the other extreme angle position, the limiting block is matched with the other inner boss, and the hot water channel completely communicates with the mixed water inlet.

Preferably, the valve housing is composed of an upper housing and a base assembled together, the base is defined as the bottom of the valve housing, the fixed valve sheet is clamped on the base, and, a second sealing member is disposed between the fixed valve sheet and the base. The valve housing structure facilitates the assembly of various components in the valve housing, and the valve housing may also be an integral member.

Compared with the prior art, the valve core of the present invention has the following advantages. By arranging the limiting portion and the limiting recess, only when the limiting portion is aligned with the limiting recess, the movable valve sheet can slide with the driving plate for closing water inlet channels, and finally the limiting portion is exposed to the side of the rotor and inserted into the limiting recess; when the driving plate rotates to a state where the limiting portion and the limiting recess are misaligned, the limiting portion is limited by the inner blocks, accordingly, the movable valve sheet cannot slide with the driving plate for closing water inlet channels. That is, the valve core can be closed only at the initial position (at a position where the handle on the valve handle is vertically downward without rotation).

It is a second object of the present invention to provide a valve core which is reasonable and compact in structure. The valve core enables water mixing (controlling the opening or closing of the water inlet channels, adjusting the water temperature), water distribution (distributing water outlet channels of the water flow), and manual closing of the faucet. When water channels are closed, a sealing ring arranged between a movable valve sheet and a fixed valve sheet of the valve core is not subject to high water pressure. The water channels are closed by a rotation of the valve handle.

For achieving the first object, the valve core comprises a valve housing having a chamber, an inner top surface, a bottom and two water inlet channels and two water outlet channels; a rotor disposed inside the valve housing; a driving plate disposed inside the valve housing and below the rotor; a valve handle disposed inside the valve housing and being capable of rotating and swinging; a movable valve sheet disposed inside the valve housing and below the driving plate; a fixed valve sheet disposed inside the valve housing and located at the bottom of the valve housing; the fixed valve sheet has a cold water inlet channel, a hot water inlet channel, a first water outlet channel and a second water outlet channel, the movable valve sheet has a recessed mixed water chamber on a top surface of the movable valve sheet, and the movable valve sheet has a first mixed water outlet and a second mixed water outlet which are arranged at regular intervals on a bottom surface of the movable valve sheet, the first mixed water outlet and the second mixed water outlet communicate with the mixed water chamber; by a rotation of the movable valve sheet, the first mixed water outlet communicates with either the cold water inlet channel or the hot water inlet channel, or the first mixed water outlet communicates with both the cold water inlet channel and the hot water inlet channel, or the first mixed water outlet blocks both the cold water inlet channel and the hot water inlet channel; by a swing of the movable valve sheet, the first mixed water outlet communicates with the first water outlet channel and the second mixed water outlet blocks the second water outlet channel, or the second mixed water outlet communicates with the second water outlet channel and the first mixed water outlet blocks the first water outlet channel; the second mixed water does not communicate with the cold water inlet channel or the hot water inlet channel.

It is a second object of the present invention to provide a pull-type faucet which is compact and reasonable in structure layout and switchable between an electric control ode and a manual mode.

For achieving the second object, a pull-type faucet comprises a faucet housing, a water outlet nozzle, a faucet handle and a water outlet pipe, wherein a base seat and the valve core are disposed inside the faucet housing, the faucet handle is connected to the valve handle; the valve housing is connected to the base seat, the base seat has a first initial water inlet channel, a second initial water inlet channel, a total water outlet channel, a first transition water outlet channel and a second transition water outlet channel, the first transition water outlet channel and a second transition water outlet channel are disposed isolated with each other; the first initial water inlet channel communicates with the cold water inlet channel, the second initial water inlet channel communicates with the hot water inlet channel, the second transition water outlet channel always communicates with the total water outlet channel and the second water outlet channel, the first water outlet channel communicates with the first transition outlet channel; an electric control switch used for controlling the communication of the first transition water outlet channel and the total water outlet channel is disposed between the first transition water outlet channel and the total water outlet channel.

Preferably, ends of the total water outlet channel, the first initial water inlet channel and the second initial water inlet channel are all located at a bottom of the base seat facing downward; the electric control switch is disposed at a top of the base seat, the water outlet pipe has a first end and a second end, the first end of the water outlet pipe is connected to an end of the total water outlet channel, the second end of the water outlet pipe extends upward and is connected to the water outlet nozzle above the base seat; a control module is disposed inside the faucet housing, the electric control switch is connected to the control module which has a sensing portion exposed out of the faucet housing.

Preferably, the base seat further has a guide slot for allowing the water outlet pipe to pass through; the faucet housing comprises a base housing fixed to a basin and a guide pipe inserted on the base housing, the base seat, the control module and the valve core are disposed in the base housing, and, the water outlet nozzle is detachably connected to a front end of the guide pipe. The guide pipe guides a water channel upward and is suitable for kitchen faucets.

To facilitate the mounting of the electric control switch, the base seat has a mounting cavity for the electric control switch to be mounted inside; a valve port is disposed between the first transition water outlet channel and the total water outlet channel, the electric switch blocks the valve port in a normal state to separate the first transmission water outlet channel and the total water outlet channel, and, when powered on, the electric control switch opens the valve port so that the first transition water outlet channel communicates with the total water outlet channel. The electric control switch may be the most common solenoid valve switch.

To facilitate the direct mounting of the two-channel valve core on the base, a side of the base has a valve core mounting surface, the valve housing is mounted on the valve core mounting surface, the first transition water outlet channel and the second transition water outlet run through the valve core mounting surface, and the outlet ends of the first water outlet channel and the second water outlet channel are arranged on the bottom surface of the valve housing. Two positioning holes may also be formed on the valve core mounting surface, and positioning columns matched with the positioning holes are disposed on the bottom of the valve housing. The two-channel valve core is positioned on the valve core mounting surface and then pressed in the faucet housing as a whole. The water outlets of the first water outlet channel and the second water outlet channel are formed on the bottom surface of the valve housing, so that the water outlet channel is connected to the transition water outlet channel without additional water pipe, and the overall structure is compact and reliable.

Compared with the prior art, the pull-type faucet of the present invention has the following advantages. The faucet can be used as an ordinary faucet when the electric control switch is damaged. In the normal state, the two-path valve core is switched to a state where water flows out through the first water outlet channel and the first transition water outlet channel. At this time, the total water discharge is controlled by the electric control switch (e.g., solenoid valve switch), so that water automatically outflows (e.g., inductive water discharge). If the electric control switch is damaged, since the electric control switch always blocks or communicates the first transition water outlet channel and the total water outlet channel, only by operating a water channel switching valve, the water channel will be switched to a state where water flows through the second water outlet channel and then flows out from the second transition water outlet channel, and the second transition water outlet channel directly communicates with the total water outlet channel, water can directly flow out from the total water outlet channel. In the process of turning off the faucet, only by operating the two-channel valve (rotating the faucet handle), the two water outlet channels of the valve core are turned off, and no water flows out. In addition, the total water outlet channel and the initial water inlet channels are arranged on the lower end face of the base and face downward, the electric control switch is arranged at the upper end of the base, and one end of the water outlet pipe is connected to the port of the total water outlet channel while the other end thereof is bent upward and connected to the water outlet nozzle located above the base. The water outlet pipe is bent from its lower end and then extends upward, and is suitable for pull-type kitchen faucets. Since the initial water inlet channels are arranged on the base, the overall structure can be more compact, and it is unnecessary to provide water inlet channels at other positions. Moreover, it is more convenient to connect a pipe inside the faucet using this valve core.

DETAILED DESCRIPTION OF THE INVENTION

Figure 1:
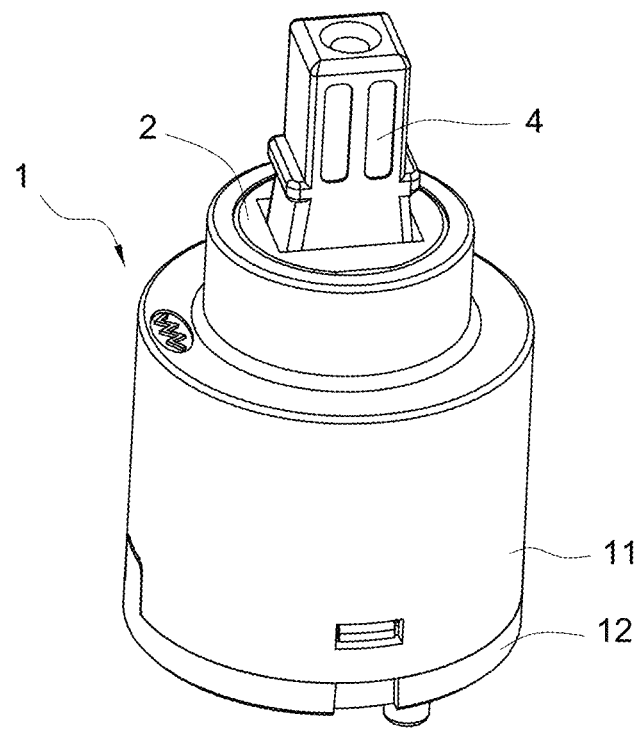
FIG. 1 is a first perspective view of a valve core according to an embodiment of the present invention.
Figure 2:
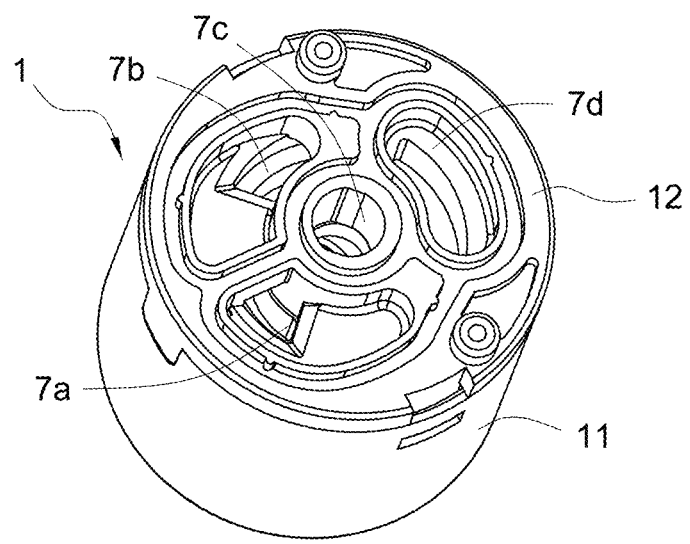
FIG. 2 is a second perspective view of the valve core according to the embodiment of the present invention.

The present invention will be further described below in detail by embodiments with reference to the accompanying drawings.

FIGS. 1-16 show a first preferred embodiment of the valve core of the present invention.

The valve core comprises a valve housing 1 having a chamber 1e, an inner top surface 1c, a bottom 1d and two water inlet channels and two water outlet channels; a rotor 2 disposed inside the valve housing 1; a driving plate 3 disposed inside the valve housing 1 and below the rotor 2; a valve handle 4 disposed inside the valve housing 1 and being capable of rotating and swinging; a movable valve sheet 5 disposed inside the valve housing 1 and below the driving plate 3; a fixed valve sheet 6 disposed inside the valve housing 1 and located at the bottom 1d of the valve housing 1. The driving plate 3 is rotatable together with the rotor 2 under the rotation of the valve handle 4 and is slidable relative to the rotor 2 under the swinging of the valve handle 4. A middle portion of the valve handle 4 is rotatably connected to the rotor 2 through a pin shaft 41. The upper end of the valve handle 4 extends out of the top of the valve housing 1, while the lower end thereof is inserted into a recess 32 on the top of the driving plate 3.

The movable valve sheet 5 is connected to the driving plate 3 located at the bottom of the driving plate 3 and is rotatable and slidable together with the driving plate 3, the fixed valve sheet 6 is positioned inside the valve housing 1 and located at the bottom 1d of the valve housing 1; the rotation of the movable valve sheet 5 is used for adjusting a mixing ratio of cold water to hot water, the sliding of the movable valve sheet 5 is used for switching the two water outlet channels and closing the two water inlet channels. The two water inlet channels comprise a cold water inlet channel 7a, a hot water inlet channel 7b formed on the fixed valve sheet 6 and the bottom 1d of the valve housing 1 correspondingly, and the two water outlet channels comprise a first water outlet channel 7c and a second water outlet channel 7d formed on the fixed valve sheet 6 and the bottom 1d of the valve housing 1 correspondingly; the movable valve sheet 5 has a mixed water chamber 51, the rotation of the movable valve sheet 5 adjusts the area of the mixed water chamber 51 which overlaps with the cold water channel 7a and the hot water channel 7b, the sliding of the movable valve sheet 5 selects whether the mixed water chamber 51 communicates with the first water outlet channel 7c or with the second water outlet channel 7d, the sliding of the movable valve sheet 5 also determines whether the movable valve sheet 5 blocks the cold water channel 7a and the hot water channel 7b or not.

The valve housing 1 is composed of an upper housing 11 and a base 12 assembled together, the base 12 is defined as the bottom 1d of the valve housing 1, the fixed valve sheet 6 is clamped on the base 12, and, a second sealing member 9b' is disposed between the fixed valve sheet 6 and the base 2.

A limiting portion 31 is disposed on the driving plate 3, the valve housing 1 has two inner blocks 1a protruding from the inner top surface 1c of the valve housing 1 and being spaced to form a limiting recess 1b between the two inner blocks 1a for receiving and limiting the limiting portion 31 of the driving plate 3; only when the limiting portion 31 is aligned with the limiting recess 1b, the movable valve sheet 5 is capable of sliding with the driving plate 3 in a direction of closing inlet water, when the limiting portion 31 is exposed to a periphery of the rotor 2, the limiting portion 31 inserts into the limiting recess 1b; and when the driving plate 3 rotates in a state where the limiting portion 31 and the limiting recess 1b are misaligned, the limiting portion 31 is blocked by the inner blocks 1a, so as to stop the movable valve sheet 5 from sliding with the driving plate 3 in a direction of closing inlet water.

The movable valve sheet 5 has a first mixed water outlet 511 and a second mixed water outlet 512 that communicate with the mixed water chamber 51, the first mixed water outlet 511 always communicates with the first water outlet channel 7c, the movable valve sheet 5 slides to determine whether the second mixed water outlet 512 communicates with the second water outlet channel 7d. The movable valve sheet 5 has a blocking wall 52 at a bottom of the movable valve sheet 5, the first mixed water outlet 511 is locate at a center of the bottom of the movable valve sheet 5, the second mixed water outlet 512 is separated from the first mixed water outlet 511 by the blocking wall 52, and when the blocking wall 52 covers the second water outlet channel 7d, the second mixed water outlet 512 is not in communication with the second water outlet channel 7d when blocked by the blocking wall 52.

When the movable valve sheet 5 is located at an initial position (in the middle and does not rotate at a certain angle), the mixed water chamber 51 communicates with the cold water channel 7a and the first water outlet channel 7c but is closed to the hot water channel 7b and the second water outlet channel 7d; when the movable valve sheet 5 slides toward the limiting recess 1b from the initial position of the movable valve sheet 5, the movable valve sheet 5 blocks both the cold water channel 7a and the hot water channel 7b, the mixed water chamber 51 is closed to both the cold water channel 7a and the hot water channel 7b, and the limiting portion 31 is inserted into the limiting recess 1b; when the movable valve sheet 5 slides opposite the limiting recess 1b from the initial position of the movable valve sheet 5, the mixed water chamber 51 communicates with the cold water channel 7a and the second water outlet channel 7d but is closed to the hot water channel 7b.

The driving plate 3 has a radial guide platform 32 protruding upward from a top surface of the driving plate 3, the limiting portion 31 is located at one end of the guide platform 32, the rotor 2 has a guide groove 21 for receiving the guide platform 32 radially distributed at the bottom of the rotor 2, the guide platform 32 is capable of sliding along the guide groove 21. The guide platform 32 has two side walls, two first columns 8a partially exposed to the corresponding side wall of the guide platform 32 are respectively disposed at one of the side walls of the guide platform 32; the rotor 2 has two inner walls at the guide groove 21, two second columns 8b partially exposed to the corresponding inner wall of the rotor 2 are respectively disposed at one of the inner walls of the rotor 2; when the movable valve sheet 5 slides with the driving plate 3, the guide platform 32 slides along the guide groove 21, each first column 8a needs to move past the corresponding second column 8b, so as to move the movable valve sheet 5 across the initial position of the movable valve sheet 5.

The driving plate 3 is connected to a top of the movable valve sheet 5, a first sealing member 9a' is disposed between the driving plate 3 and the movable valve sheet 5, the movable valve sheet 5 has a concave cavity opening upward defined as the mixed water chamber 51, and, the bottom of the driving plate 3 covers the concave cavity; the first water outlet channel 7c is located at a center of the bottom 1d of the valve housing 1, the cold water channel 7a, the hot water channel 7b and the second water outlet channel 7d surround the first water outlet channel 7c.

The rotor 2 has a limiting block 22 protruding from the periphery of the rotor 2, and the limiting block 22 is located between two inner blocks 1a to limit a rotation angle of the rotor 2.

The operation principle and process of the valve core will be described below.

Figure 3:
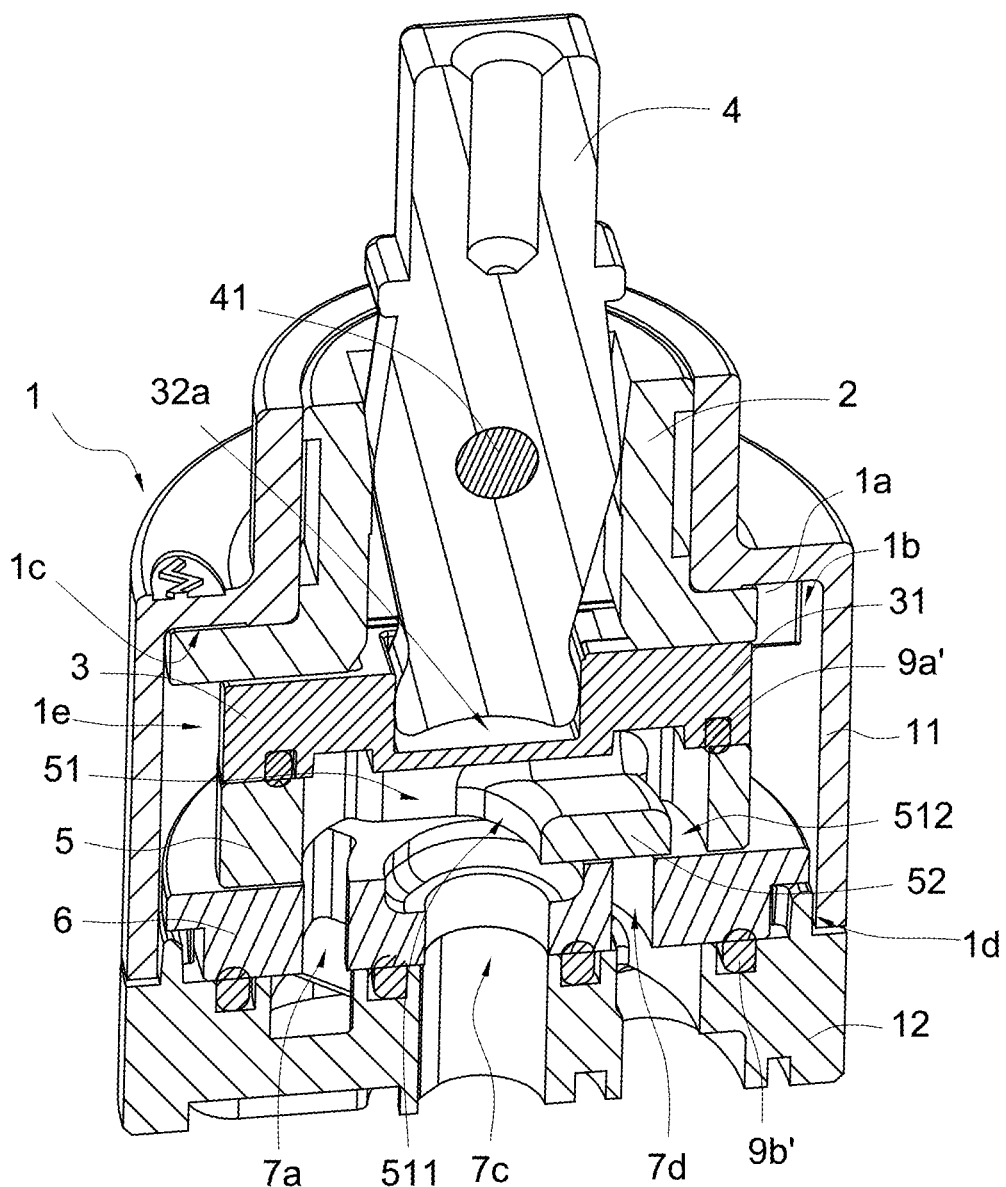
FIG. 3 is a vertically sectional view of the valve core according to the embodiment of the present invention (the valve handle swings to a state where water flows out of the first water outlet channel from the initial position (in the middle and not rotating))
Figure 4:
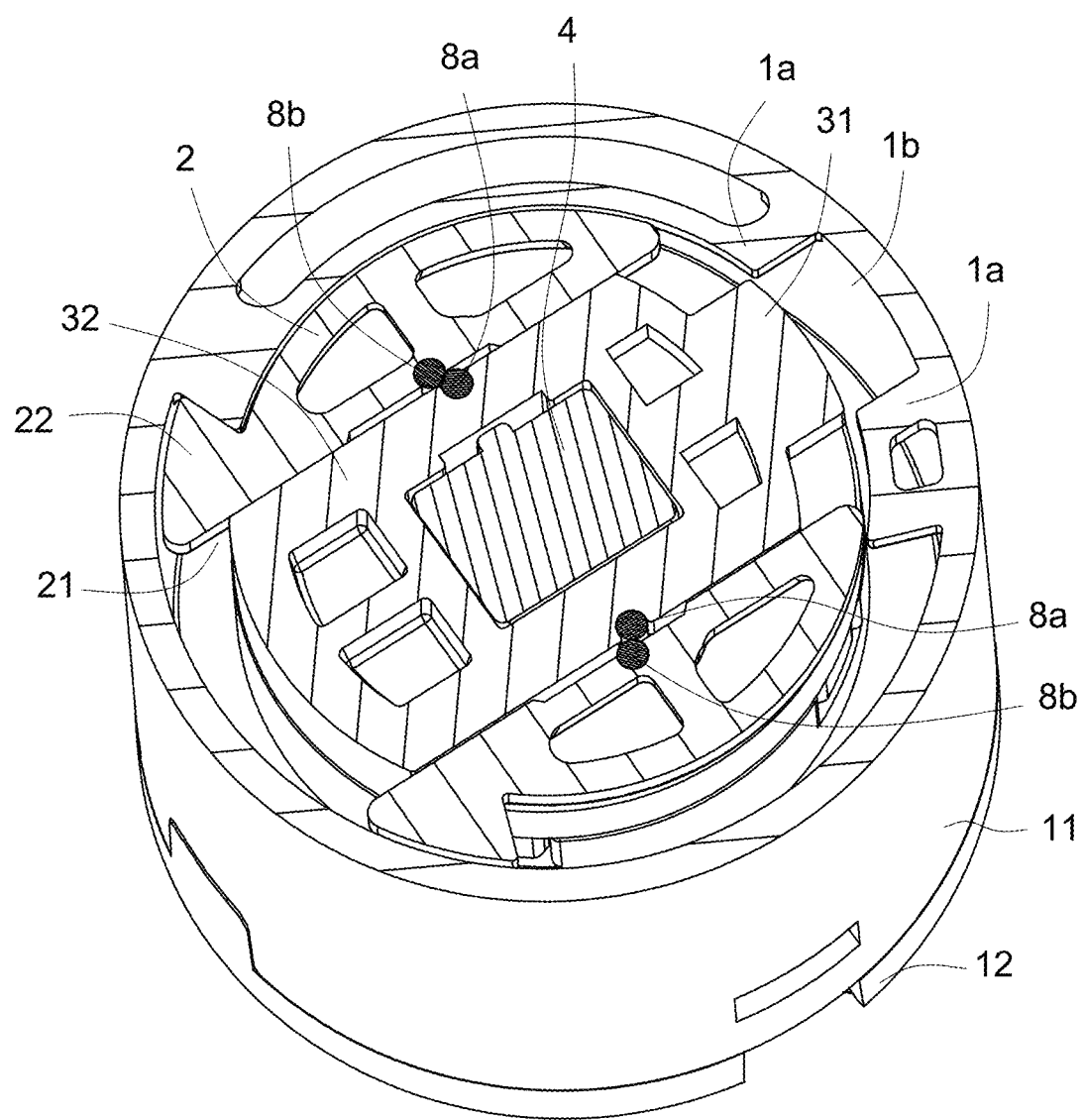
FIG. 4 is a transversely sectional view of the valve core according to the embodiment of the present invention (the valve handle swings to a state where water flows out of the first water outlet channel from the initial position)
Figure 5:
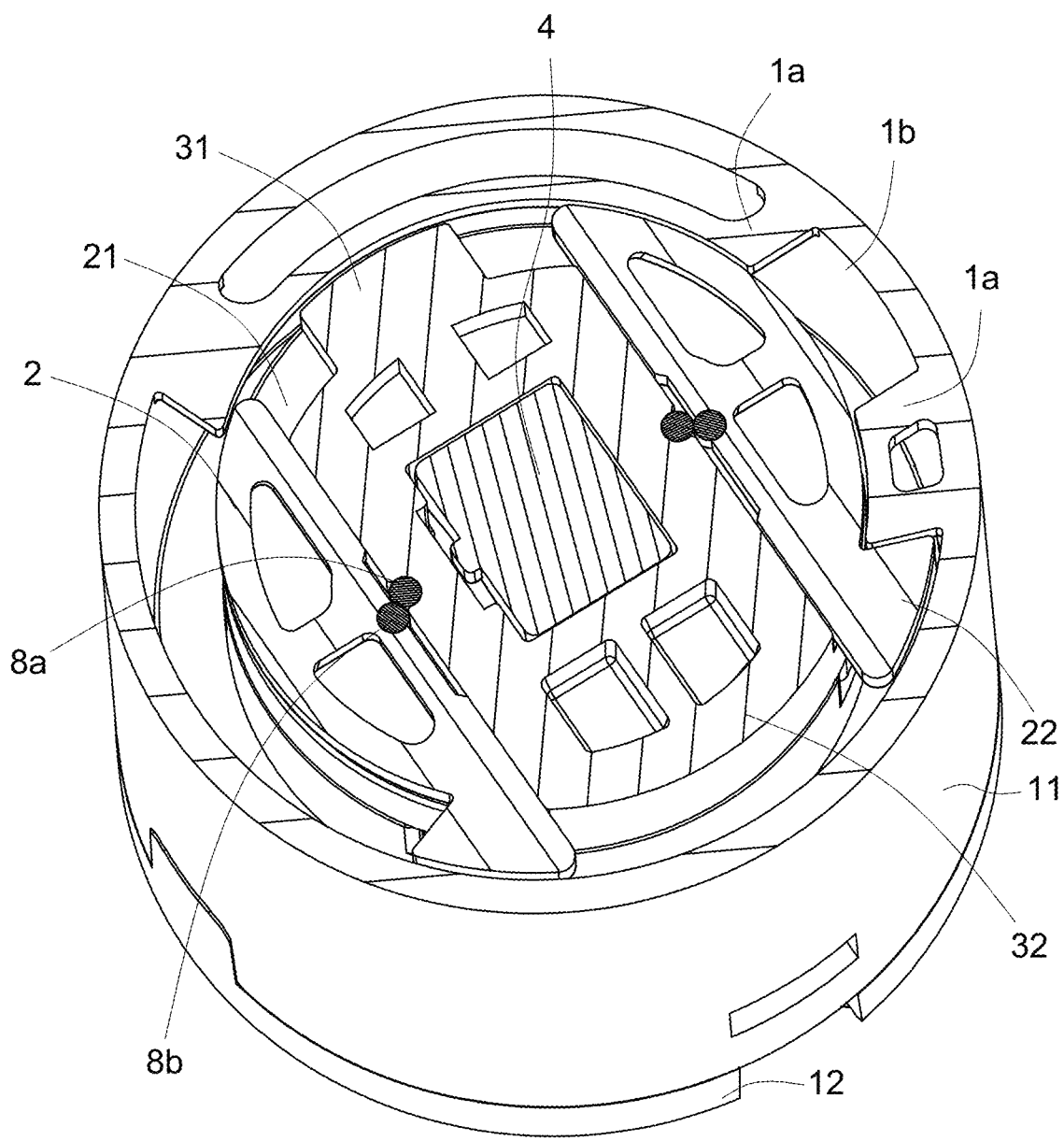
FIG. 5 is a transversely sectional view of the valve core according to the embodiment of the present invention (in a state where the movable valve sheet rotates by an angle)
Figure 6:
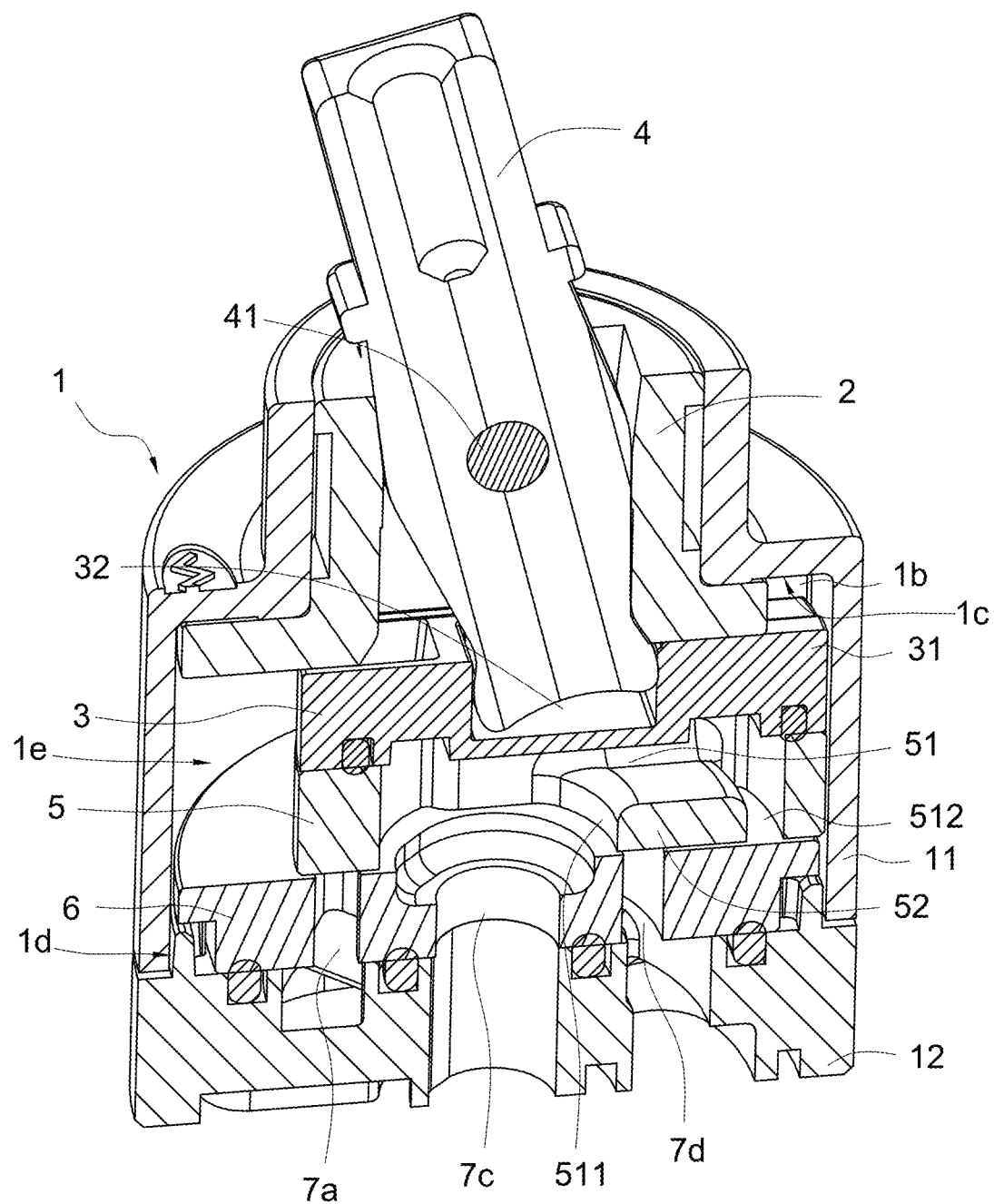
FIG. 6 is a vertically sectional view of the valve core according to the embodiment of the present invention (the valve handle swings to a state where water inlet channels are closed from the initial position)
Figure 7:
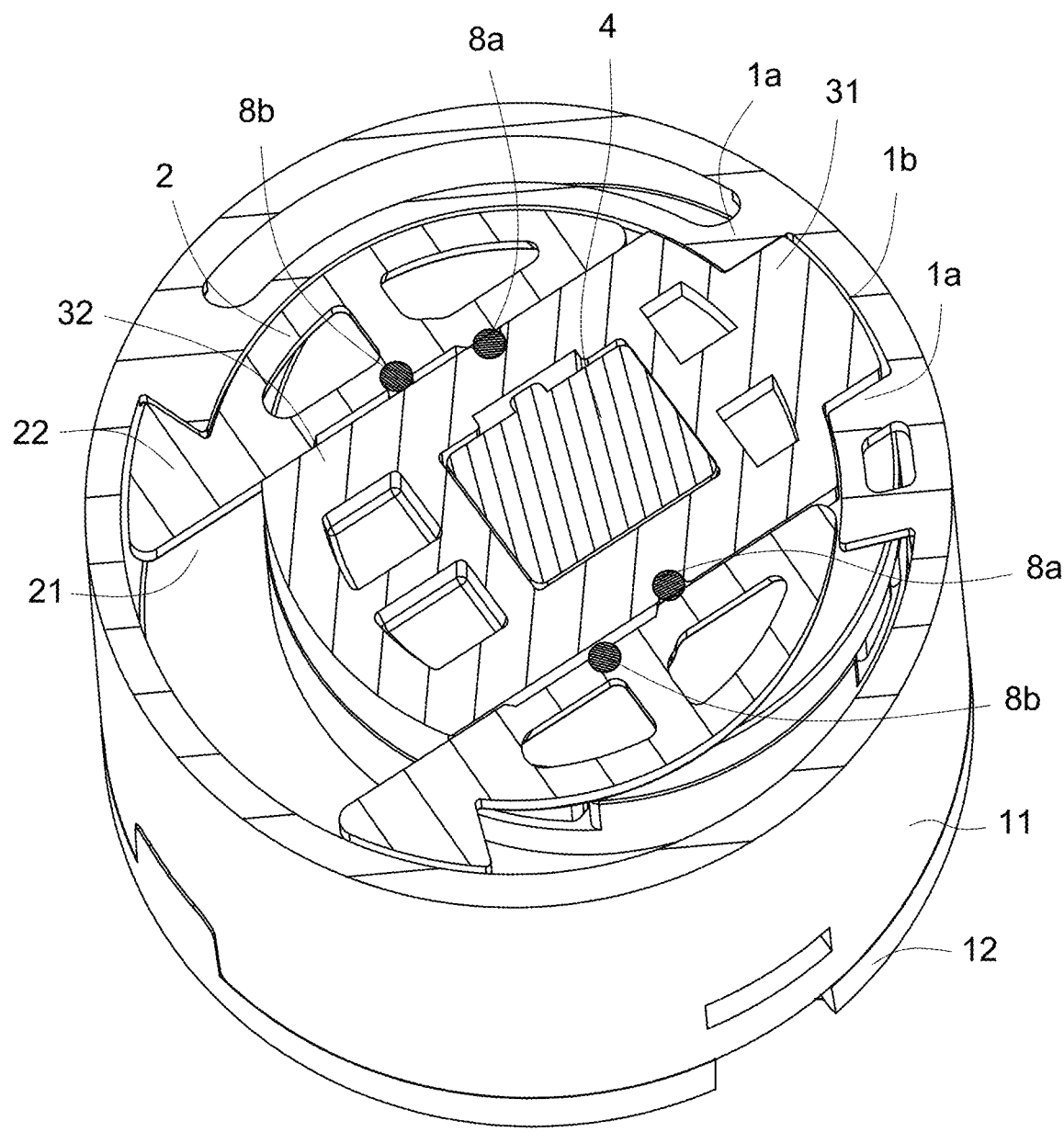
FIG. 7 is a transversely sectional view of the valve core according to the embodiment of the present invention (the valve handle swings to a state where water inlet channels are closed from the initial position)
Figure 10:
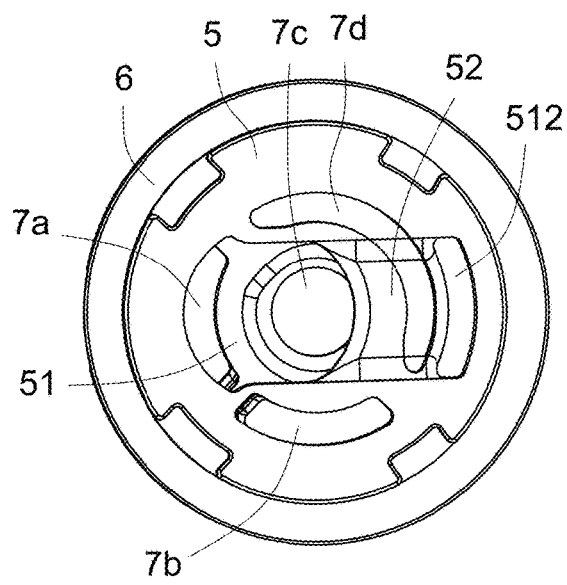
FIG. 10 is a view of a movable valve sheet cooperating with a fixed valve sheet according to the embodiment of the present invention (in a full cold water state)
Figure 11:
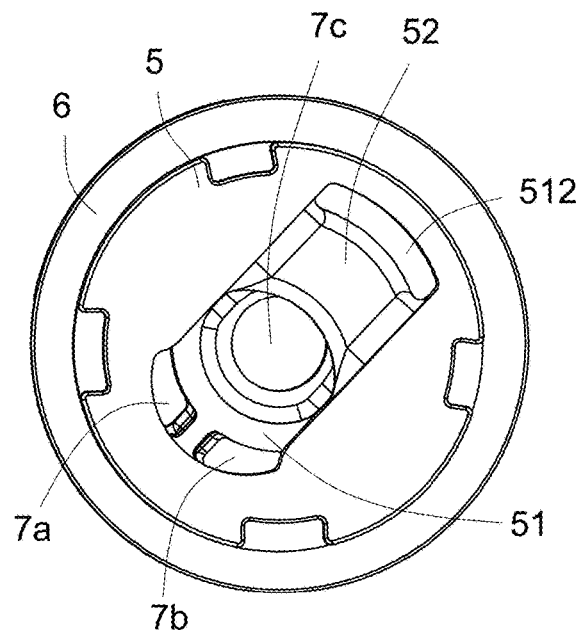
FIG. 11 is a view of the movable valve sheet cooperating with the fixed valve sheet according to the embodiment of the present invention (in a mixed water state)
Figure 12:
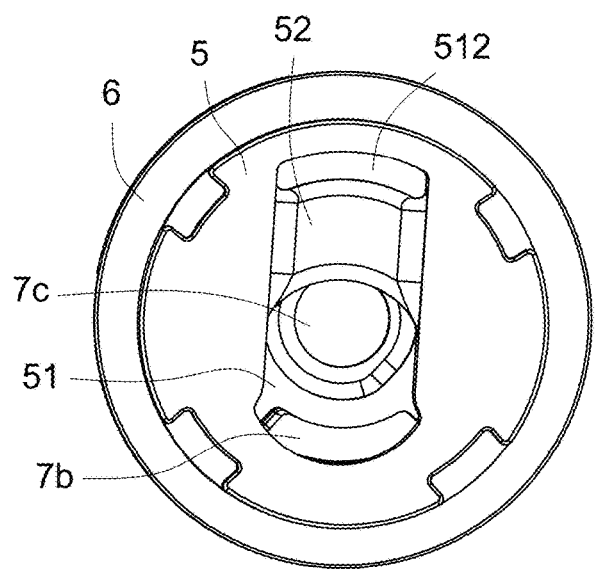
FIG. 12 is a view of the movable valve sheet cooperating with the fixed valve sheet according to the embodiment of the present invention (in a full hot water state)
Figure 13:
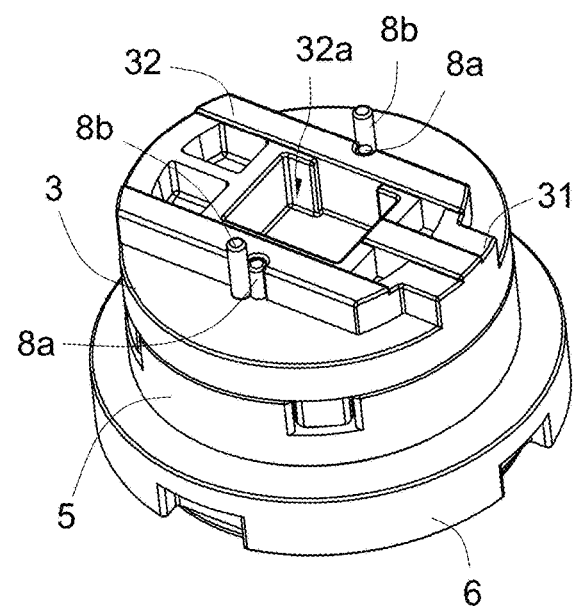
FIG. 13 is a perspective view of first columns cooperating with second columns according to the embodiment of the present invention (in a state where the valve handle does not swing)
Figure 14:
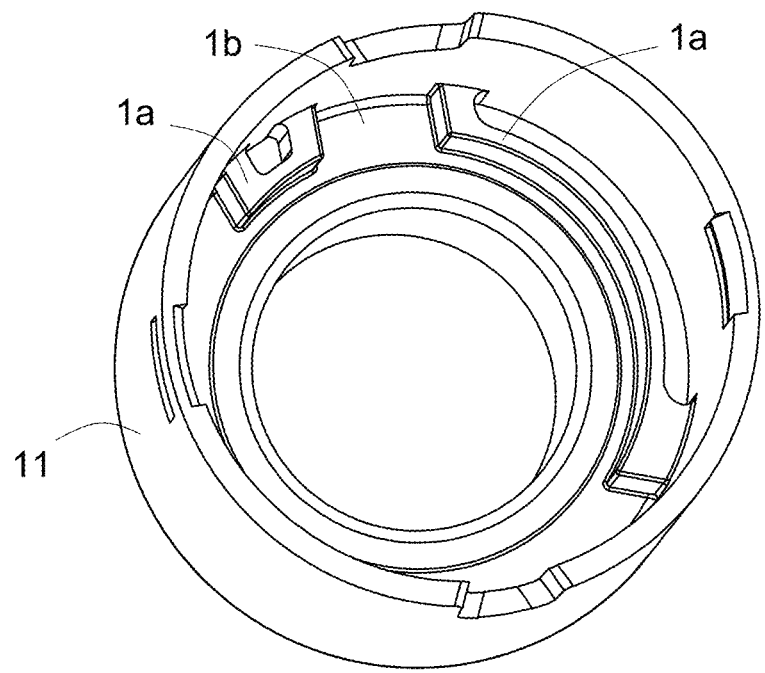
FIG. 14 is a perspective view of a motor according to the embodiment of the present invention.
Figure 15:
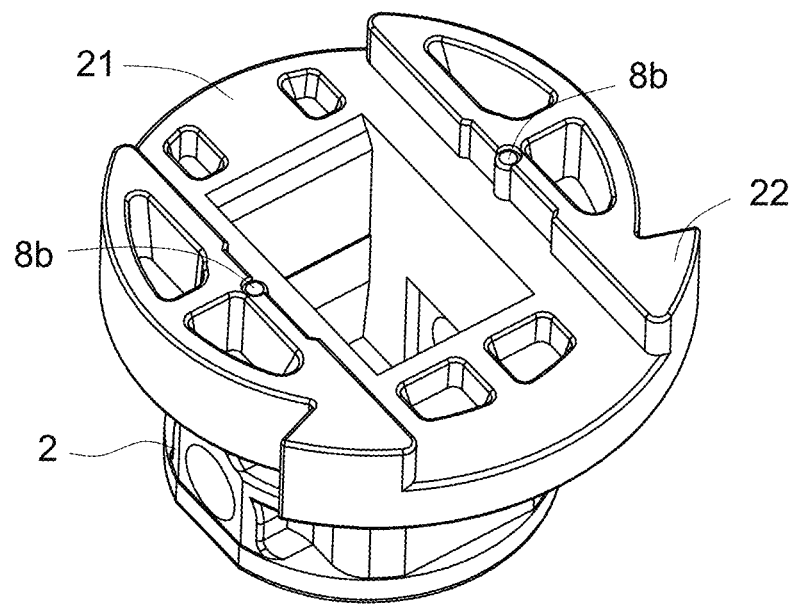
FIG. 15 is a perspective view of a valve housing according to the embodiment of the present invention.
Figure 16:
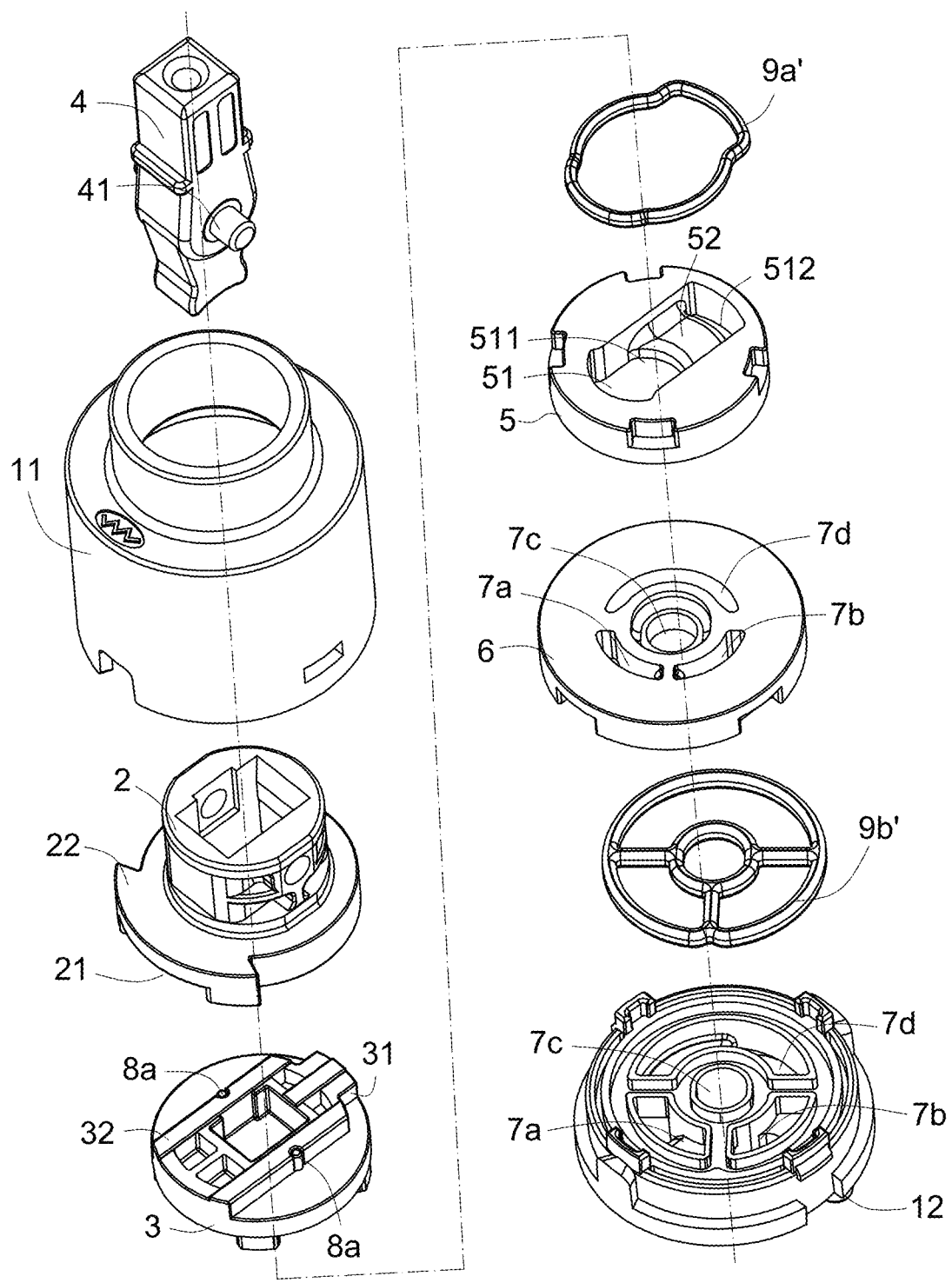
FIG. 16 is an exploded view of the valve core according to the embodiment.
Figure 17:
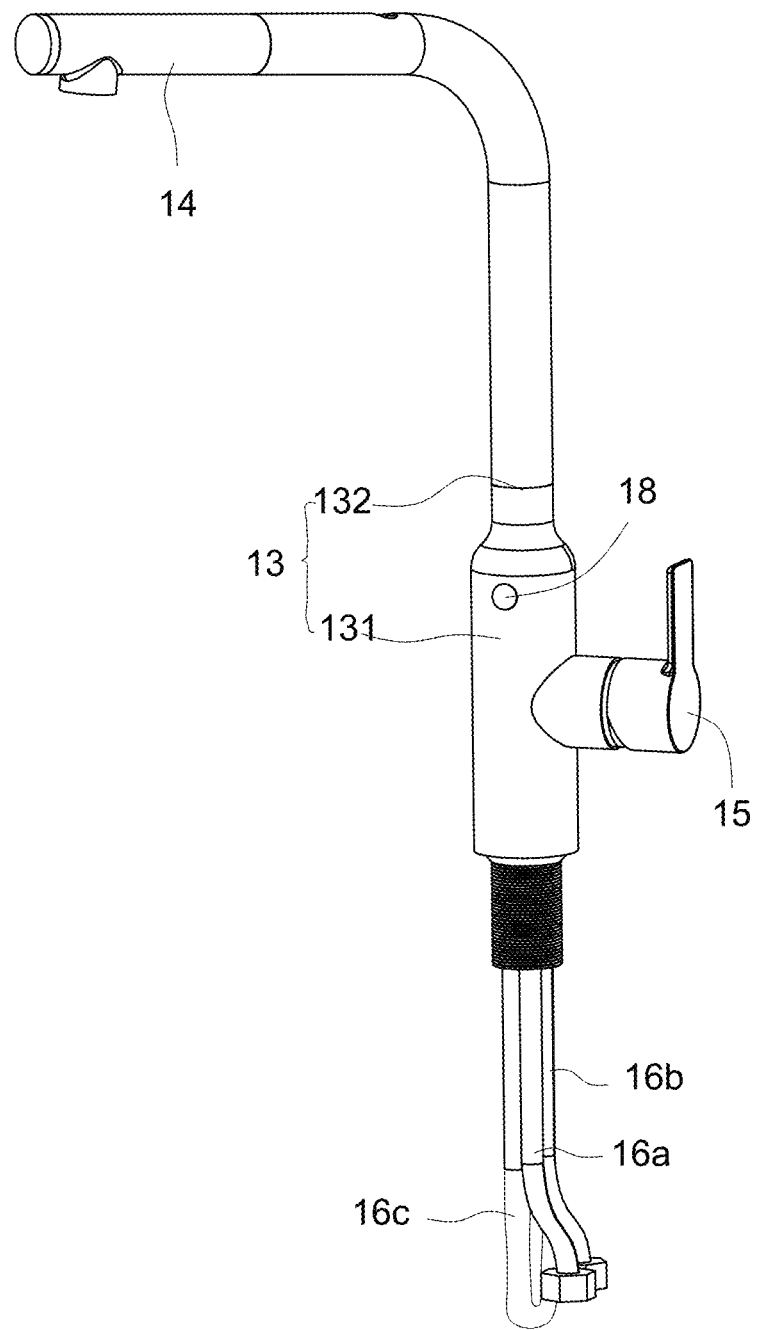
FIG. 17 is a perspective view of a faucet according to the embodiment of the present invention.
Figure 18:
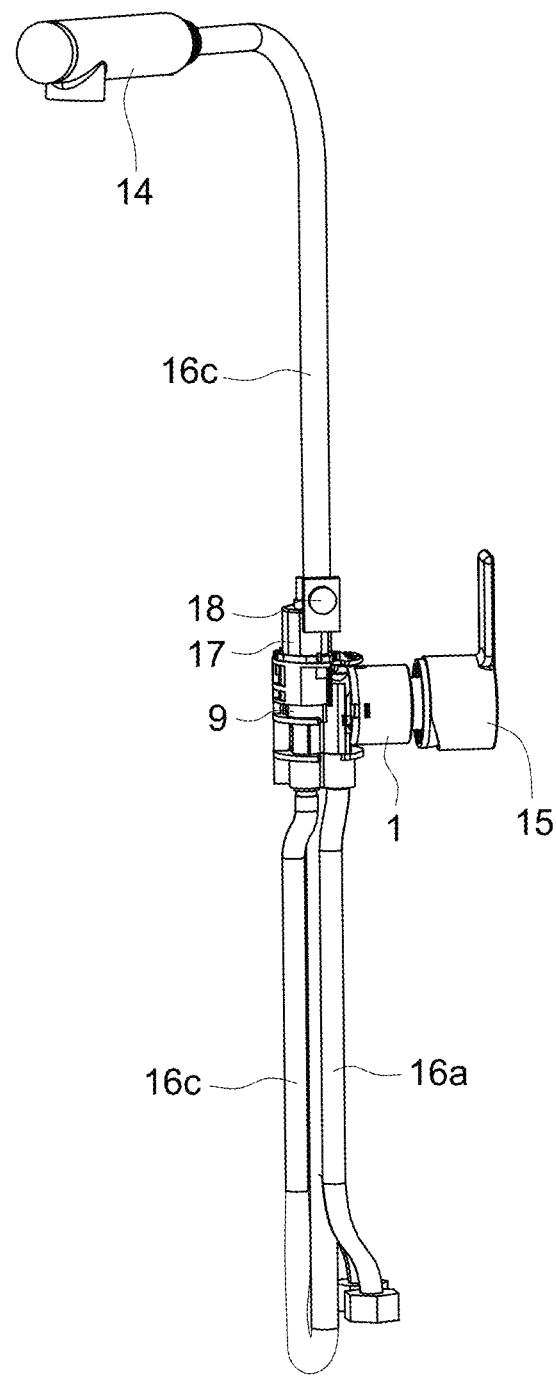
FIG. 18 is a first perspective view of the faucet when the faucet housing is omitted according to the embodiment of the present invention.
Figure 19:
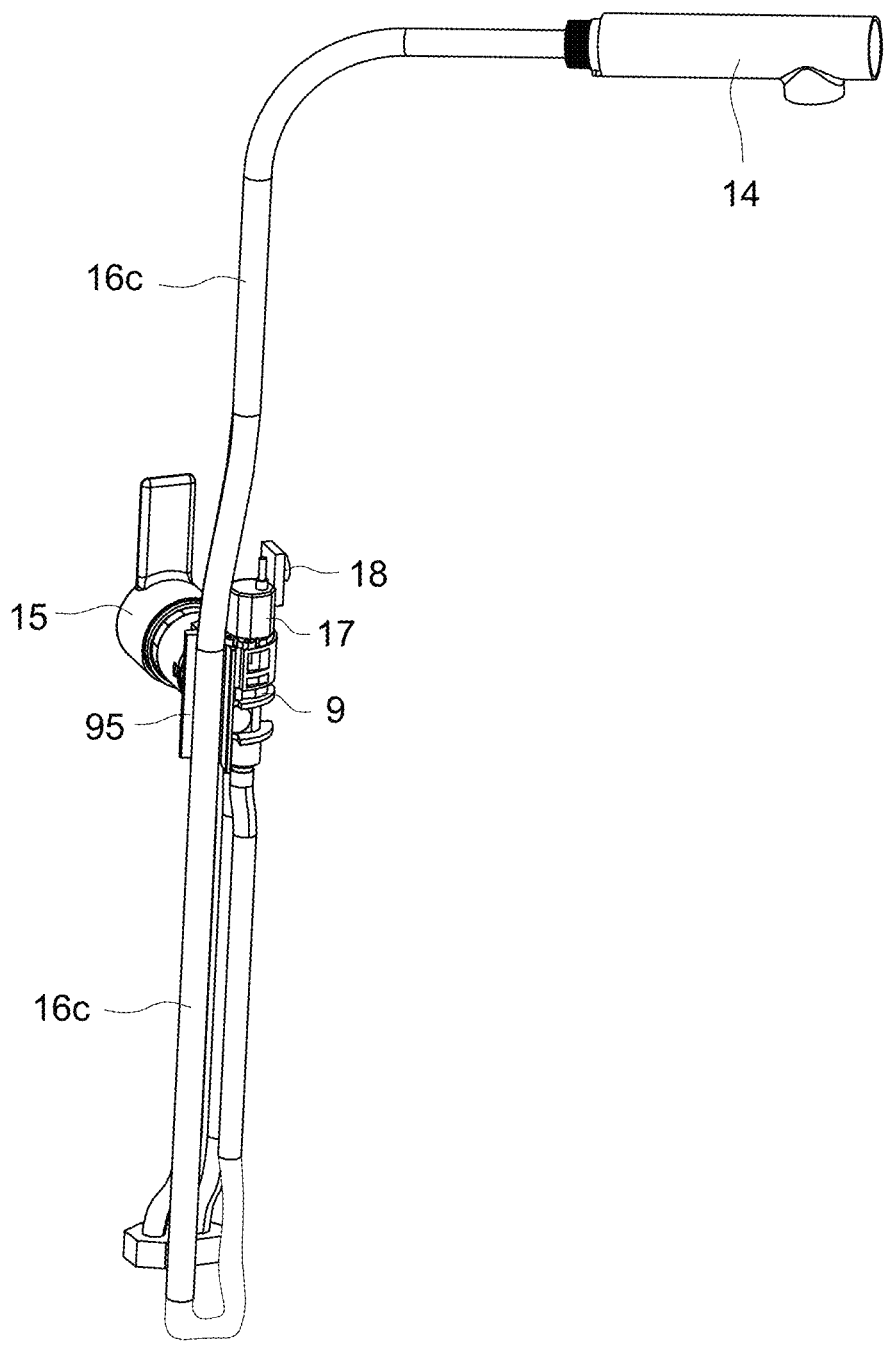
FIG. 19 is a second perspective view of the faucet when the faucet housing is omitted according to the embodiment of the present invention.
Figure 20:
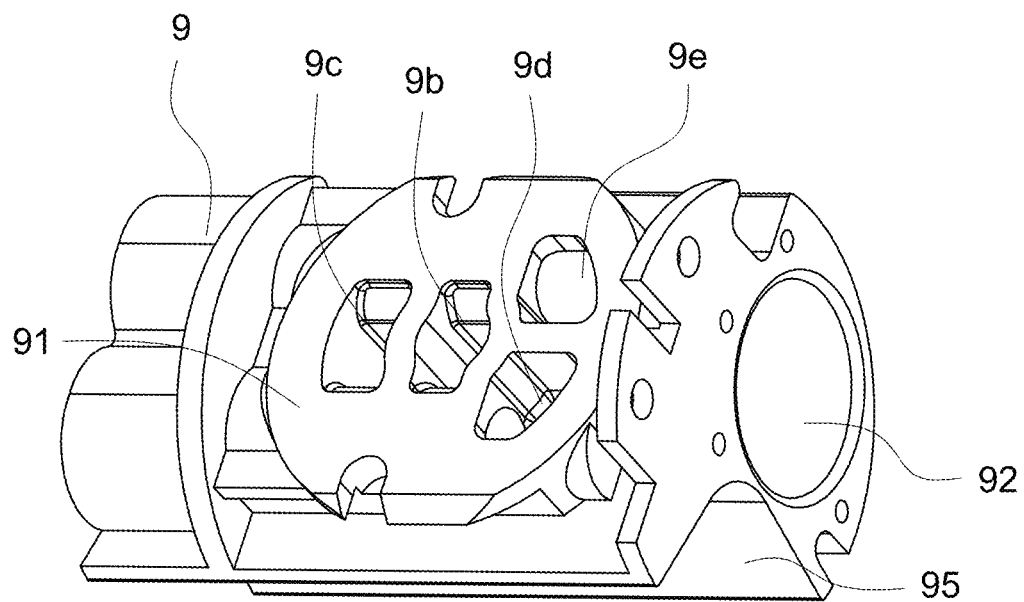
FIG. 20 is a first perspective view of a base according to the embodiment of the present invention.
Figure 21:
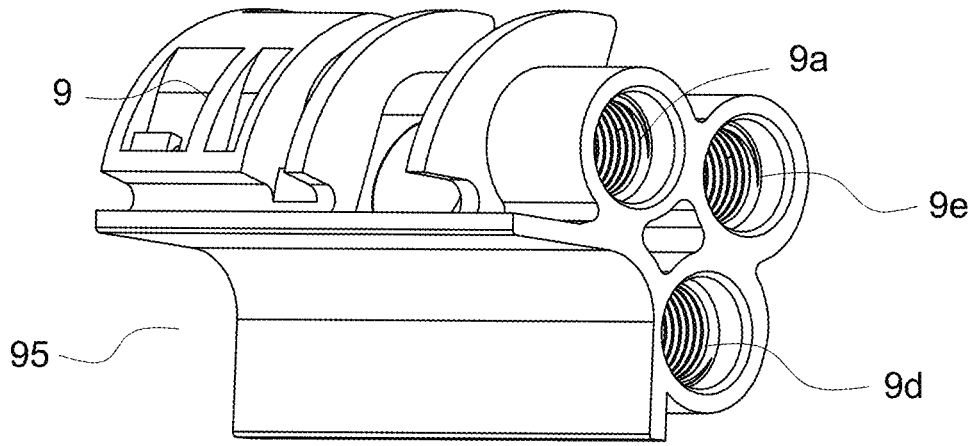
FIG. 21 is a second perspective view of the base according to the embodiment of the present invention.
Figure 22:
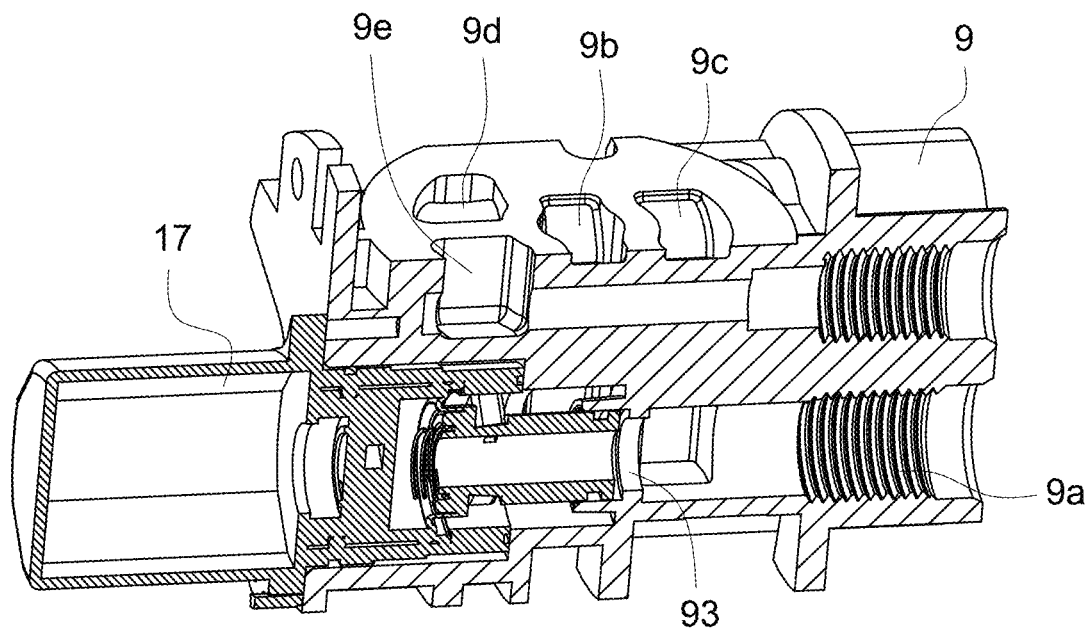
FIG. 22 is a sectional view of a part of the base according to the embodiment of the present invention.
Figure 23:
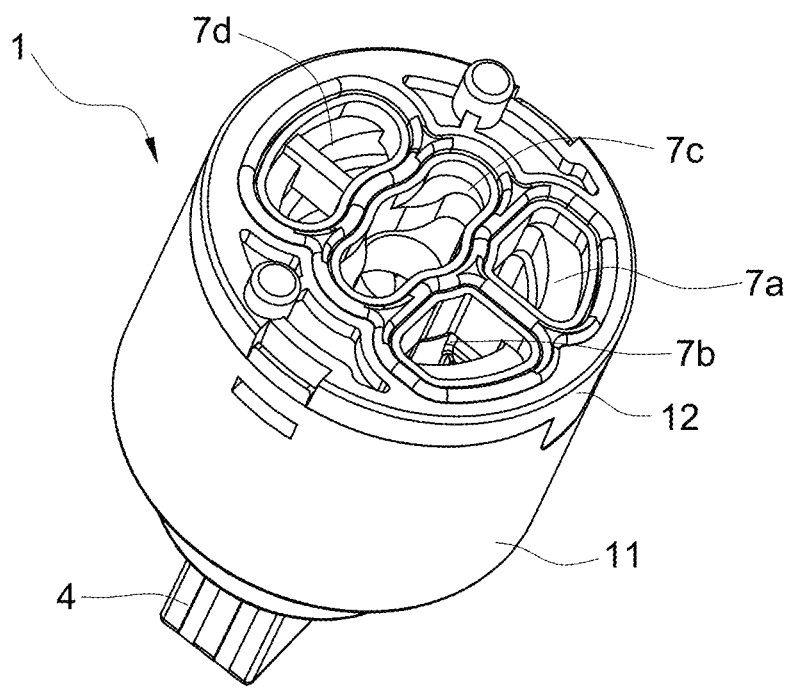
FIG. 23 is a perspective view of a valve core according to the embodiment of the present invention.
Figure 24:
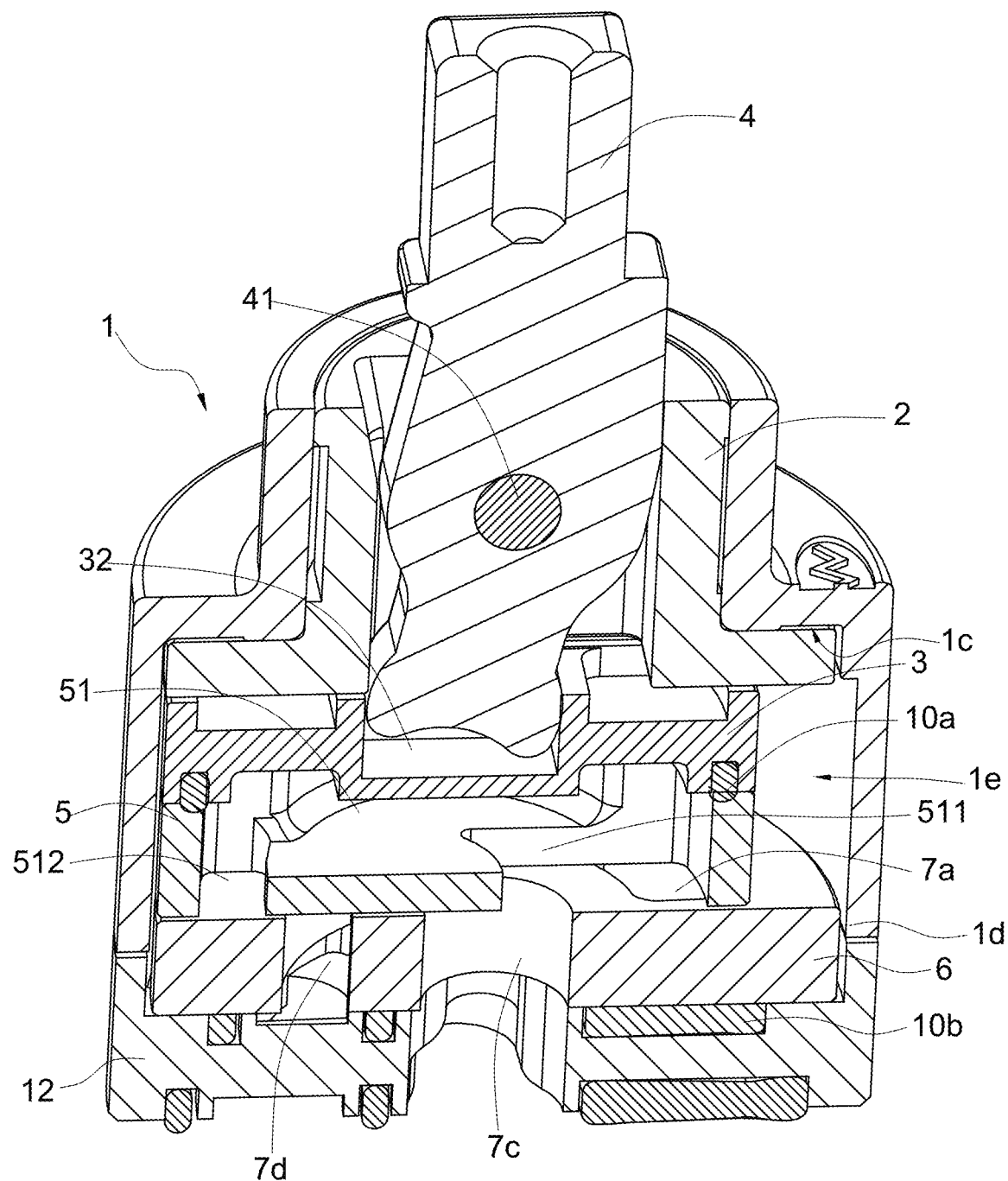
FIG. 24 is a sectional view of the valve core according to the embodiment of the present invention (in a state where a valve handle does not swing and water outflows from the faucet automatically by sensing)
Figure 25:
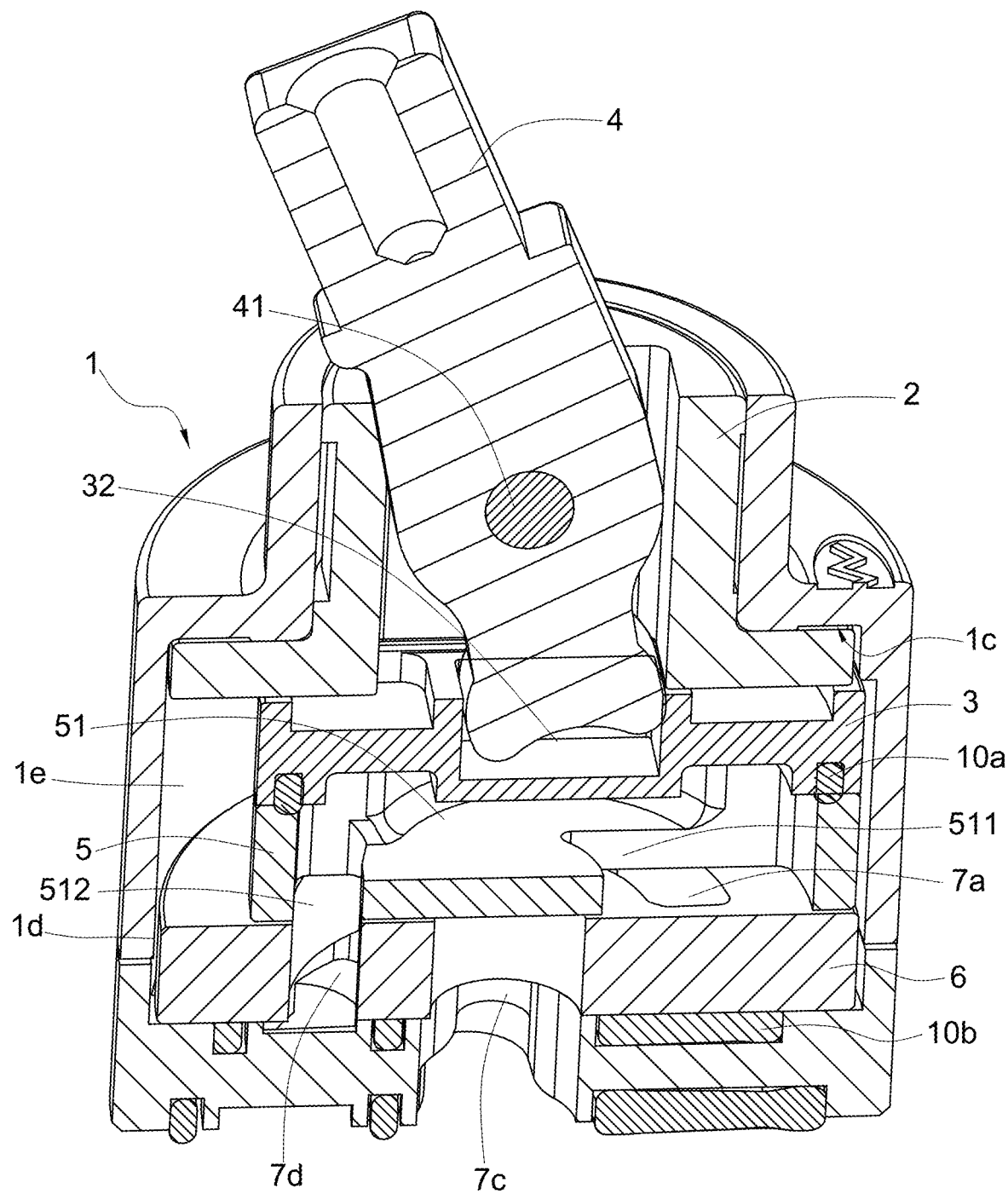
FIG. 25 is a sectional view of the valve core according to the embodiment of the present invention (in a state where the valve handle swings leftward and water outflows from the faucet manually)
Figure 26:
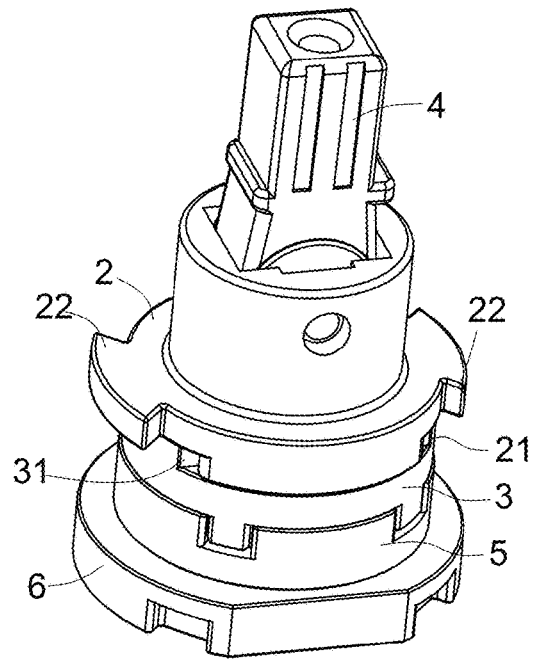
FIG. 26 is a perspective view of the valve core according to the embodiment of the present invention when a valve housing is omitted (in the state where the valve handle does not swing and water outflows from the faucet automatically by sensing)
Figure 27:
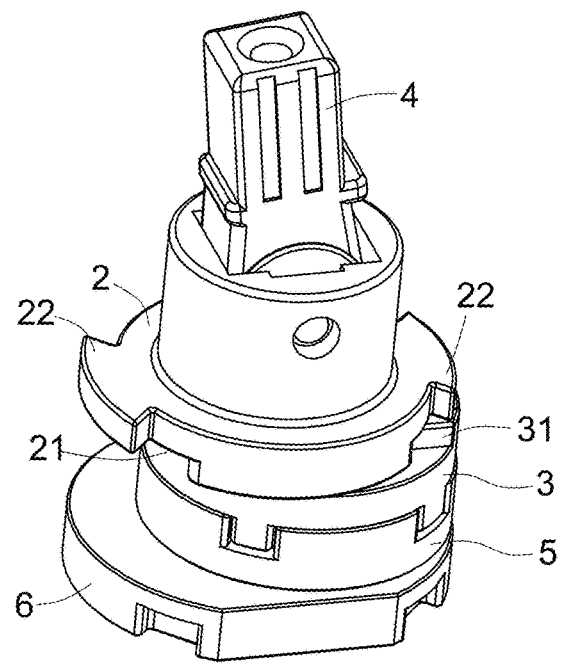
FIG. 27 is a perspective view of the valve core according to the embodiment of the present invention when the valve housing is omitted (in the state where the valve handle swings leftward and water outflows from the faucet manually)
Figure 28:
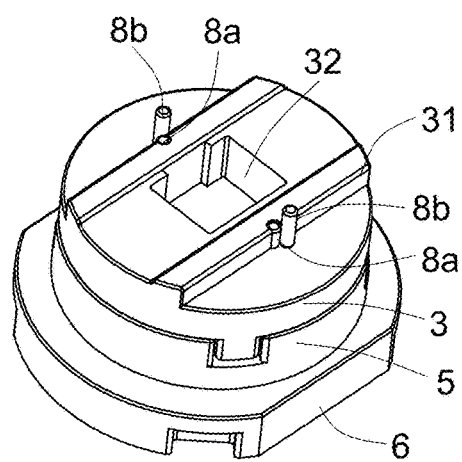
FIG. 28 is a perspective view of first columns cooperating with second columns according to the embodiment of the present invention (in the state where the valve handle does not swing)
Figure 29:
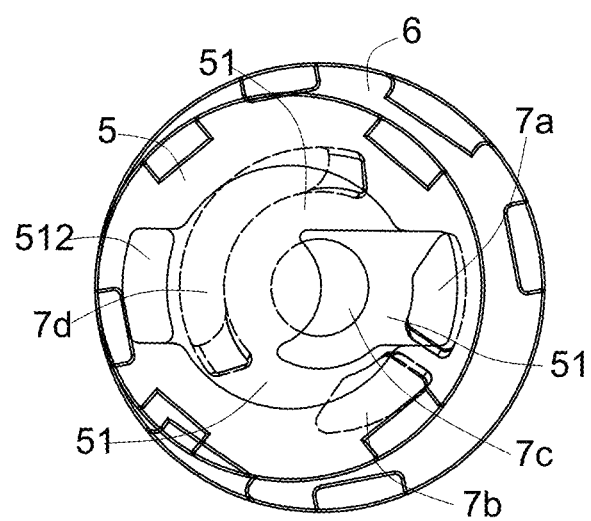
FIG. 29 is a schematic diagram of the valve core according to the embodiment of the present invention showing different water channels (in a state where the valve handle is located at an initial position and water outflows from the faucet automatically by sensing)
Figure 30:
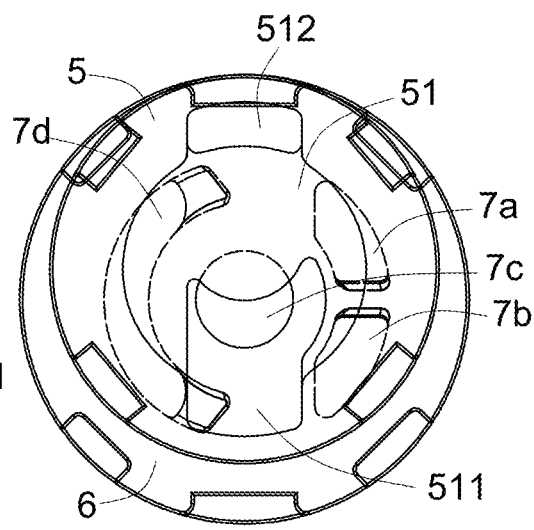
FIG. 30 is a schematic diagram of the valve core according to the embodiment of the present invention showing different water channels (in a state where water outflows from the faucet automatically by sensing and the valve handle is rotated to close water channels)
Figure 31:
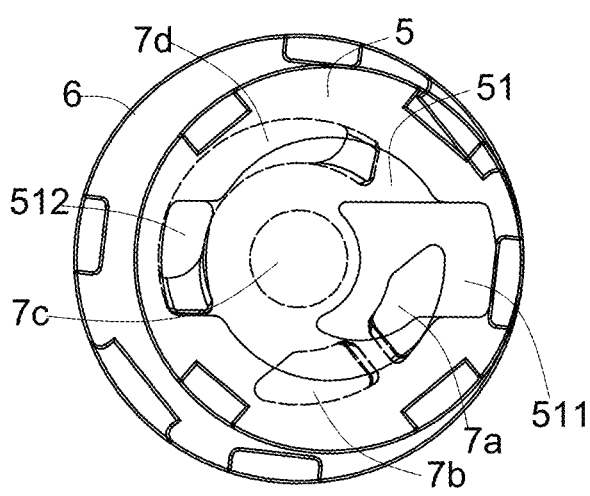
FIG. 31 is a schematic diagram of the valve core according to the embodiment of the present invention showing different water channels (in the state where water outflows from the faucet manually)
Figure 32:
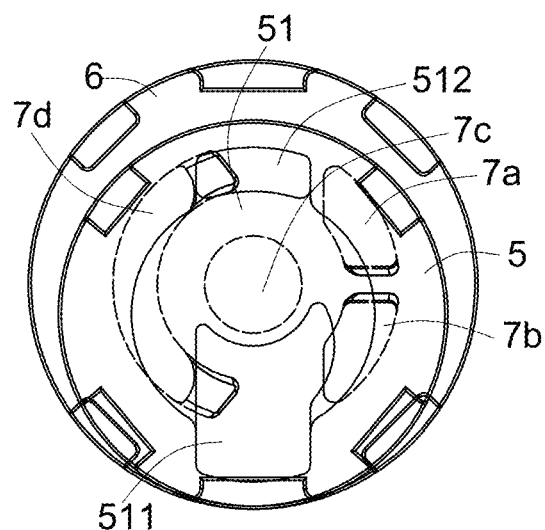
FIG. 32 is a schematic diagram of the valve core according to the embodiment of the present invention showing different water channels (in a state where water outflows from the faucet manually in a smallest water volume)
Figure 33:
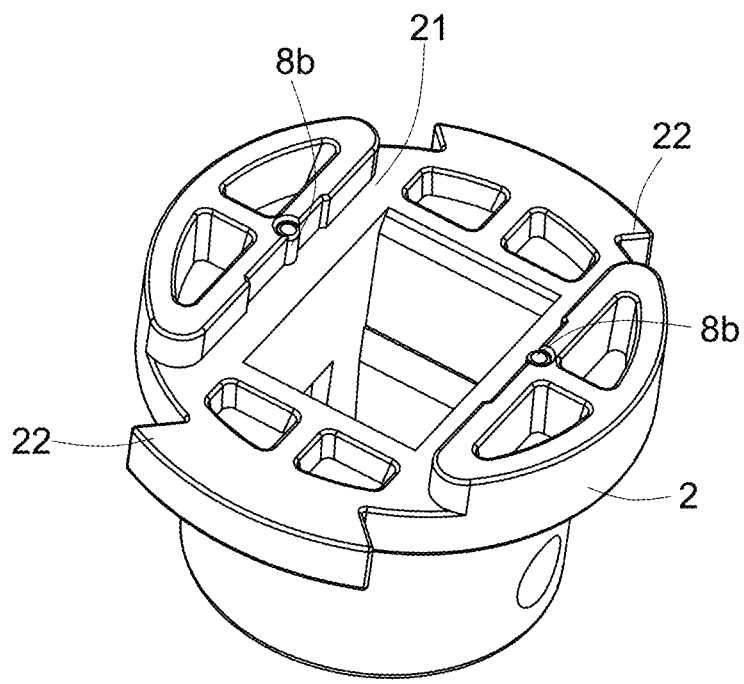
FIG. 33 is a perspective view of a motor of the valve core according to the embodiment of the present invention.
Figure 34:
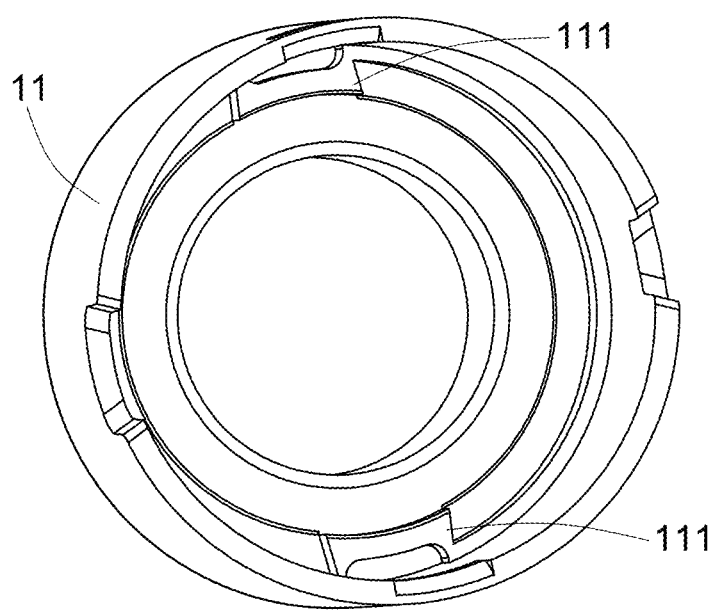
FIG. 34 is a perspective view of the valve housing of the valve core according to the embodiment of the present invention.
Figure 35:
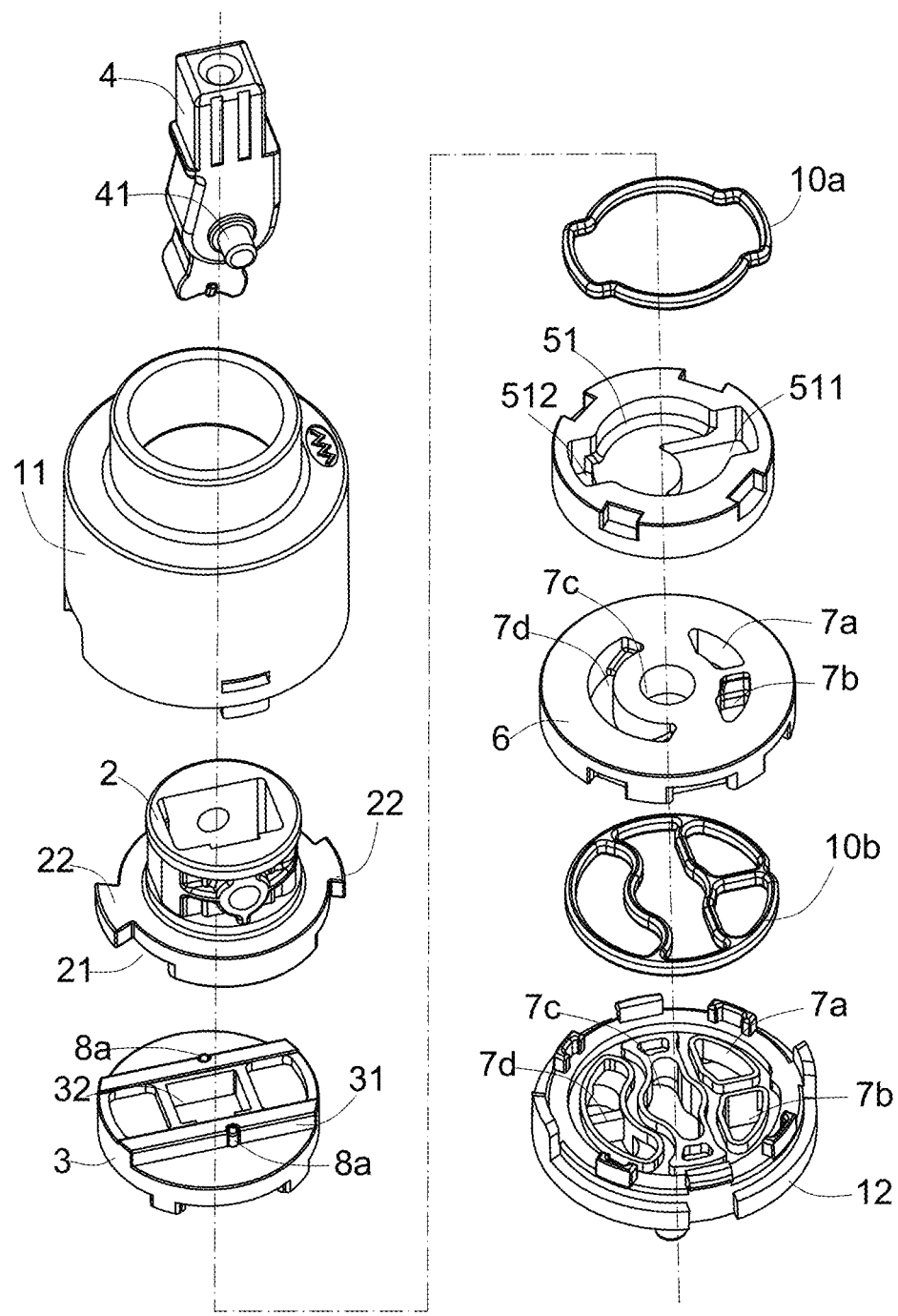
FIG. 35 is an exploded view of the valve core according to the embodiment of the present invention.

As shown in FIGS. 3, 4 and 10, in a state where the valve handle 4 does not swing back and forth and does not drive the driving plate 3 and the movable valve sheet 5 to slide radially that is, the valve handle 4 does not rotate around the pin shaft 41, the movable valve sheet 5 is at the initial position, and the mixed water chamber 51 communicates with the cold water channel 7a and the first water outlet channel 7c but not communicated with the hot water channel 7b and the second water outlet channel 7d. Thus, cold water flows through the cold water channel 7a and the mixed water chamber 51 and then flows out of the first water outlet channel 7c, and no water flows out of the second water outlet channel 7d. That is, this is a full cold water state. As shown in FIGS. 5, 11 and 12, the rotation of the movable valve sheet 5 can communicate the mixed water chamber 51 with the cold water channel 7a and/or the hot water channel 7b, that is, the rotation of the movable valve sheet 5 adjusts the ratio of cold water to hot water, thereby realizing the adjustment of the water flow temperature.

Figure 8:
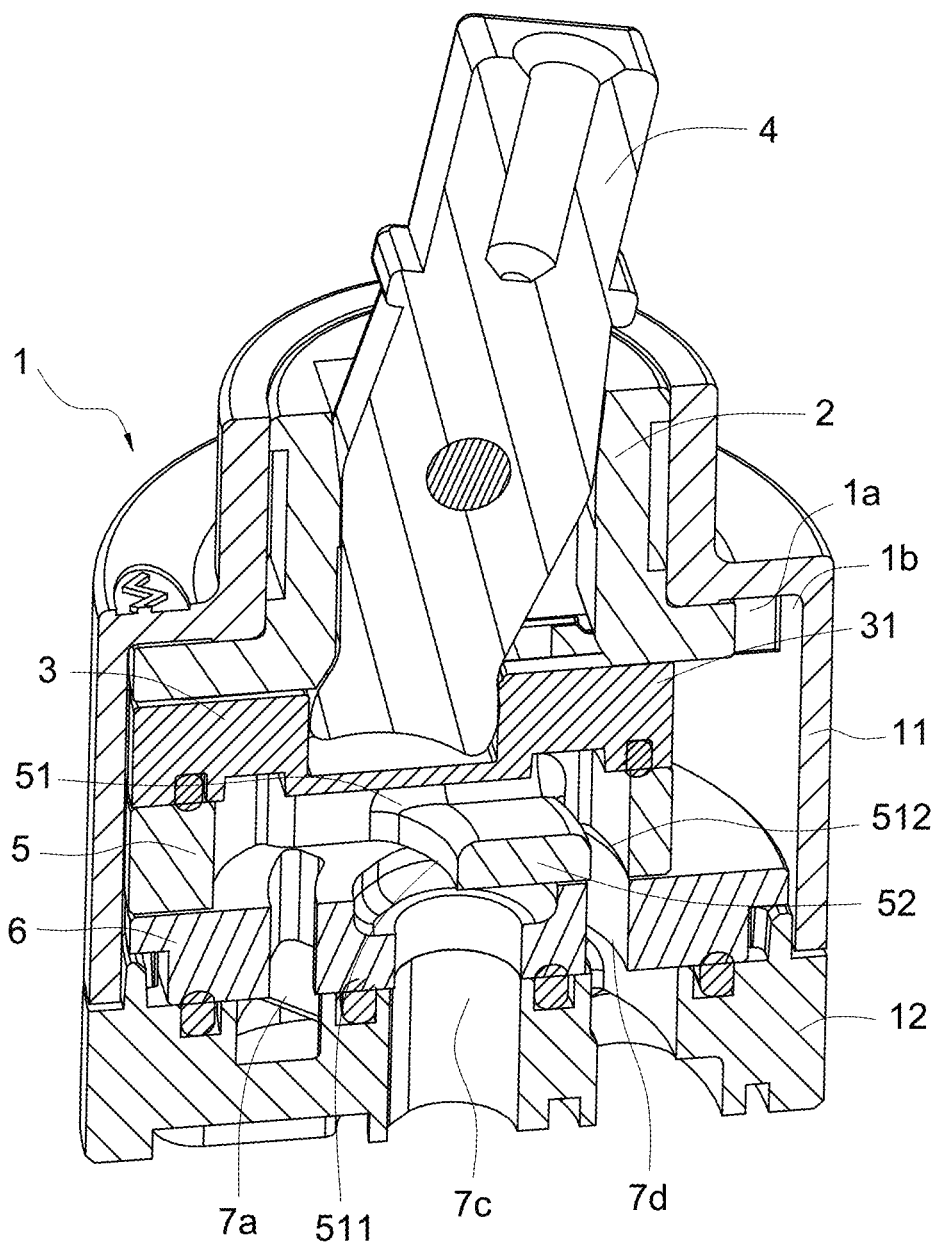
FIG. 8 is a vertically sectional view of the valve core according to the embodiment of the present invention (the valve handle swings to a state where water flows out of the second water outlet channel from the initial position)

As shown in FIGS. 5, 8 and 12, the limiting portion 31 can be aligned with the limiting recess 1b only when the movable valve sheet 5 is at the initial position. The valve handle 4 drives the movable valve sheet 5 to slide with the driving plate 3 to one side from the initial position, the limiting recess 1b can evade the movement of the driving plate 3, and the limiting portion 31 is inserted into the limiting recess 1b, so that the blocking wall of the movable valve sheet 5 can block both the cold water channel 7a and the hot water channel 7b. Since the cold water channel 7a and the hot water channel 7b are not communicated with the mixed water chamber 51, no water flows out of both the first water outlet channel 7c and the second water outlet channel 7d. In this state, water flow channels are closed.

Figure 9:
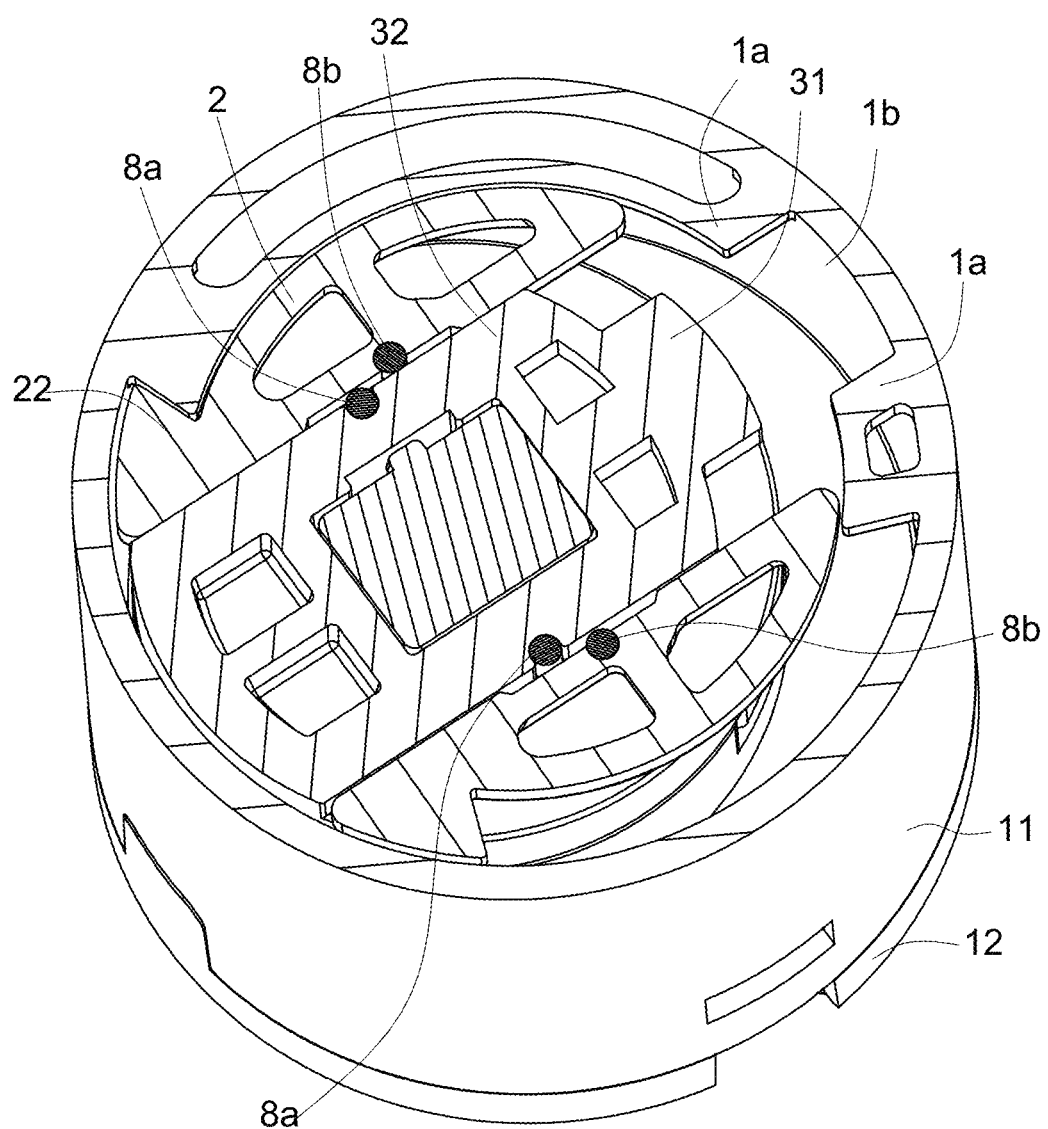
FIG. 9 is a transversely sectional view of the valve core according to the embodiment of the present invention (the valve handle swings to a state where water flows out of the second water outlet channel from the initial position)

As shown in FIGS. 8 and 9, the valve handle 4 drives the movable valve sheet 5 to slide with the driving plate 3 to the other side from the initial position, and the bottom surface of the movable valve sheet 5 does not block the cold water channel 7a. The mixed water chamber 51 is communicated with the cold water channel 7a, the first water outlet channel 7c and the second water outlet channel 7d but not communicated with the hot water channel 7b. The cold water flows out in two channels, where one channel of the cold water flows through the mixed water chamber 51 and then flows out of the first water outlet channel 7c, and the other channel of the cold water flows through the mixed water chamber 51 and then flows out of the second water outlet channel 7d. That is, in this state, water in cold. The rotation of the movable valve sheet 5 can communicate the mixed water chamber 51 with the cold water channel 7a and/or the hot water channel 7b, that is, the rotation of the movable valve sheet 5 adjusts the ratio of cold water to hot water, thereby realizing the adjustment of the water flow temperature.

FIGS. 17 to 35 show a preferred embodiment of the pull-type faucet of the present invention.

The pull-type faucet comprises a faucet housing 13, a water outlet nozzle 14, a faucet handle 15 and a water outlet pipe 16c. A base seat 9 and the valve core described in the second embodiment are disposed inside the faucet housing 13. As show in FIGS. 23-35, the valve core comprises a valve housing 1 having a chamber 1e, an inner top surface 1c, a bottom 1d and two water inlet channels and two water outlet channels; a rotor 2 disposed inside the valve housing 1; a driving plate 3 disposed inside the valve housing 1 and below the rotor 2; a valve handle 4 disposed inside the valve housing 1 and being capable of rotating and swinging; a movable valve sheet 5 disposed inside the valve housing 1 and below the driving plate 3; a fixed valve sheet 6 disposed inside the valve housing 1 and located at the bottom 1d of the valve housing 1; the fixed valve sheet 5 has a cold water inlet channel 7a, a hot water inlet channel 7b, a first water outlet channel 7c and a second water outlet channel 7d, the movable valve sheet 5 has a recessed mixed water chamber 51 on a top surface of the movable valve sheet 5, and the movable valve sheet 5 has a first mixed water outlet 511 and a second mixed water outlet 512 which are arranged at regular intervals on a bottom surface of the movable valve sheet 5, the first mixed water outlet 511 and the second mixed water outlet 512 communicate with the mixed water chamber 51; by a rotation of the movable valve sheet 5, the first mixed water outlet 511 communicates with either the cold water inlet channel 7a or the hot water inlet channel 7b, or the first mixed water outlet 511 communicates with both the cold water inlet channel 7a and the hot water inlet channel 7b, or the first mixed water outlet 511 blocks both the cold water inlet channel 7a and the hot water inlet channel 7b, that is, the bottom surface of the movable valve sheet 5 blocks the cold water inlet channel 7a and the hot water inlet channel 7b; by a swing of the movable valve sheet 5, the first mixed water outlet 511 communicates with the first water outlet channel 7c and the second mixed water outlet 512 blocks the second water outlet channel 7d, or the second mixed water outlet 512 communicates with the second water outlet channel 7d and the first mixed water outlet 511 blocks the first water outlet channel 7c; the rotation or swing of the movable valve sheet 5 does not enable the second mixed water 512 to communicate with the cold water inlet channel 7a or the hot water inlet channel 7b.

When the movable valve sheet 5 is located at an initial position (in the middle and does not rotate at a certain angle), the first mixed water outlet 511 communicates with the first water outlet channel 7c and the second mixed water 512 blocks the second water outlet channel 7d, the movable valve sheet 5 rotates to enable the first mixed water outlet 511 to communicate with the cold water inlet channel 7a and/or the hot water inlet channel 7b, or the movable valve sheet 5 rotates to enable both the first mixed water outlet 511 and the second mixed water 512 to communicate with/block the cold water inlet channel 7a and the hot water inlet channel 7b; when the movable valve sheet 5 swings from the initial position to one side, the second mixed water 512 communicates with the second water outlet channel 7d and the first mixed water outlet 511 blocks the first water outlet channel 7c, the movable valve sheet 5 rotates to enable the first mixed water outlet 511 to communicate with the cold water inlet channel 7a and/or the hot water inlet channel 7b. A middle portion of the valve handle 4 is rotatably connected to the rotor 2 through a pin shaft 41. The upper end of the valve handle 4 extends out of the top of the valve housing 1, while the lower end thereof is inserted into a recess 32 on the top of the driving plate 3. The rotor 2 has a limiting block 22 protruding from the periphery of the rotor 2, and the valve housing 1 has two blocks 111 protruding from the inner top surface 1c of the valve housing 1, the two blocks 111 are located at regular intervals at the inner top surface 1c of the valve housing 1 circumferentially along the valve housing 1, the limiting block 22 is located between two blocks 111 to limit a rotation angle of the rotor 2.

The faucet handle 15 is connected to the valve handle 4; the valve housing 1 is connected to the base seat 9, the base seat 9 has a first initial water inlet channel 9d, a second initial water inlet channel 9e, a total water outlet channel 9a, a first transition water outlet channel 9b and a second transition water outlet channel 9c, the first transition water outlet channel 9b and a second transition water outlet channel 9c are disposed isolated with each other; the first initial water inlet channel 9d communicates with the cold water inlet channel 7a, the second initial water inlet channel 9e communicates with the hot water inlet channel 7b, the second transition water outlet channel 9c always communicates with the total water outlet channel 9a and the second water outlet channel 7d, the first water outlet channel 7c communicates with the first transition outlet channel 9b; an electric control switch 17 used for controlling the communication of the first transition water outlet channel 9b and the total water outlet channel 9a is disposed between the first transition water outlet channel 9b and the total water outlet channel 9a.

Ends of the total water outlet channel 9a, the first initial water inlet channel 9d and the second initial water inlet channel 9e are all located at a bottom of the base seat 9 facing downward; the electric control switch 17 is disposed at a top of the base seat 9, the water outlet pipe 16c has a first end and a second end, the first end of the water outlet pipe 16c is connected to an end of the total water outlet channel 9a, the second end of the water outlet pipe 16c extends upward and is connected to the water outlet nozzle 14 above the base seat 9; a control module 18 is disposed inside the faucet housing 13, the electric control switch 17 is connected to the control module 18 which has a sensing portion exposed out of the faucet housing 13.

The base seat 9 further has a guide slot 95 for allowing the water outlet pipe 16c to pass through; the faucet housing 13 comprises a base housing 131 fixed to a basin and a guide pipe 132 inserted on the base housing 131, the base seat 9, the control module 18 and the valve core are disposed in the base housing 131, and, the water outlet nozzle 14 is detachably connected to a front end of the guide pipe 132.

The base seat 9 has a mounting cavity 92 for the electric control switch 17 to be mounted inside; a valve port 93 is disposed between the first transition water outlet channel 9b and the total water outlet channel 9a, the electric switch 17 blocks the valve port 93 in a normal state to separate the first transmission water outlet channel 9b and the total water outlet channel 9a, and, when powered on, the electric control switch opens the valve port 93 so that the first transition water outlet channel 9b communicates with the total water outlet channel 9a.

It should be noted that in the description of the present invention, the terms "front, back", "left, right", "up, down", "clockwise", "counterclockwise", etc. to describe a direction or position based on the accompanying drawings are only used for describe the present invention and simplify the description, instead of indicating that devices or elements must have particular orientation or must be constructed and operated in a particular orientation. So that these terms indicating directions should not be used as restrictions. The verbs "connect" should be understood broadly. For example, it can be fixedly connected or detachably connected or integrally connected or directly connected or connected through intermediate mediums or connected in two members. For technicians in this field, the specific meanings of these terms used in the present invention can be understood in specific contexts.

The invention claimed is:

1. A valve core, comprising:
    a valve housing having a chamber, an inner top surface, a bottom and two water inlet channels and two water outlet channels;
    a rotor disposed inside the valve housing;
    a driving plate disposed inside the valve housing and below the rotor;
    a valve handle disposed inside the valve housing and being capable of rotating and swinging;
    a movable valve sheet disposed inside the valve housing and below the driving plate;
    a fixed valve sheet disposed inside the valve housing and located at the bottom of the valve housing;
    wherein,
    the driving plate is rotatable together with the rotor under the rotation of the valve handle and is slidable relative to the rotor under the swinging of the valve handle, the driving plate has a limiting portion protruding at a periphery of the driving plate;
    the movable valve sheet is connected to the driving plate and is rotatable and slidable together with the driving plate, the rotation of the movable valve sheet is used for adjusting a mixing ratio of cold water to hot water, the sliding of the movable valve sheet is used for switching the two water outlet channels and closing the two water inlet channels;

the valve housing has two inner blocks protruding from the inner top surface of the valve housing and being spaced to form a limiting recess between the two inner blocks for receiving and limiting the limiting portion of the driving plate;

only when the limiting portion is aligned with the limiting recess, the movable valve sheet is capable of sliding with the driving plate in a direction of closing inlet water, when the limiting portion is exposed to a periphery of the rotor, the limiting portion inserts into the limiting recess;

and when the driving plate rotates in a state where the limiting portion and the limiting recess are misaligned, the limiting portion is blocked by the inner blocks, so as to stop the movable valve sheet from sliding with the driving plate in a direction of closing inlet water.

2. The valve core of claim 1, wherein the two water inlet channels comprise a cold water inlet channel, a hot water inlet channel formed on the fixed valve sheet and the bottom of the valve housing correspondingly, and the two water outlet channels comprise a first water outlet channel and a second water outlet channel formed on the fixed valve sheet and the bottom of the valve housing correspondingly;

the movable valve sheet has a mixed water chamber, the rotation of the movable valve sheet adjusts the area of the mixed water chamber which overlaps with the cold water channel and the hot water channel, the sliding of the movable valve sheet selects whether the mixed water chamber communicates with the first water outlet channel or with the second water outlet channel, the sliding of the movable valve sheet also determines whether the movable valve sheet blocks the cold water channel and the hot water channel or not.

3. The valve core of claim 2, wherein the movable valve sheet has a first mixed water outlet and a second mixed water outlet that communicate with the mixed water chamber, the first mixed water outlet always communicates with the first water outlet channel, the movable valve sheet slides to determine whether the second mixed water outlet communicates with the second water outlet channel.

4. The valve core of claim 3, wherein when the movable valve sheet is located at an initial position, the mixed water chamber communicates with the cold water channel and the first water outlet channel but is closed to the hot water channel and the second water outlet channel;

when the movable valve sheet slides toward the limiting recess from the initial position of the movable valve sheet, the movable valve sheet blocks both the cold water channel and the hot water channel, the mixed water chamber is closed to both the cold water channel and the hot water channel, and the limiting portion is inserted into the limiting recess;

when the movable valve sheet slides opposite the limiting recess from the initial position of the movable valve sheet, the mixed water chamber communicates with the cold water channel and the second water outlet channel but is closed to the hot water channel.

5. The valve core of claim 1, wherein the driving plate has a radial guide platform protruding upward from a top surface of the driving plate, the limiting portion is located at one end of the guide platform, the rotor has a guide groove for receiving the guide platform radially distributed at the bottom of the rotor, the guide platform is capable of sliding along the guide groove.

6. The valve core of claim 5, wherein the guide platform has two side walls, two first columns partially exposed to the corresponding side wall of the guide platform are respectively disposed at one of the side walls of the guide platform;

the rotor has two inner walls at the guide groove, two second columns partially exposed to the corresponding inner wall of the rotor are respectively disposed at one of the inner walls of the rotor;

when the movable valve sheet slides with the driving plate, the guide platform slides along the guide groove, each first column needs to move past the corresponding second column, so as to move the movable valve sheet across the initial position of the movable valve sheet.

7. The valve core of claim 4, wherein the movable valve sheet has a blocking wall at a bottom of the movable valve sheet, the first mixed water outlet is locate at a center of the bottom of the movable valve sheet, the second mixed water outlet is separated from the first mixed water outlet by the blocking wall, and when the blocking wall covers the second water outlet channel, the second mixed water outlet is not in communication with the second water outlet channel when blocked by the blocking wall.

8. The valve core of claim 7, wherein the driving plate is connected to a top of the movable valve sheet, a first sealing member is disposed between the driving plate and the movable valve sheet, the movable valve sheet has a concave cavity opening upward defined as the mixed water chamber, and, the bottom of the driving plate covers the concave cavity;

the first water outlet channel is located at a center of the bottom of the valve housing, the cold water channel, the hot water channel and the second water outlet channel surround the first water outlet channel;

the valve handle is capable of rotating with the rotor through a pin shaft running axially through a middle of the valve handle and the rotor;

the driving plate has a concaved cavity on the top of the driving plate, the valve handle has a bottom end extending downward and being positioned inside the concaved cavity to drive the driving plate to slide.

9. The valve core of claim 1, wherein the rotor has a limiting block protruding from the periphery of the rotor, and the limiting block is located between two inner blocks to limit a rotation angle of the rotor.

10. The valve core of claim 1, wherein the valve housing is composed of an upper housing and a base assembled together, the base is defined as the bottom of the valve housing, the fixed valve sheet is clamped on the base, and, a second sealing member is disposed between the fixed valve sheet and the base.

11. A pull-out faucet, comprising:
a faucet housing;
a water outlet nozzle;
a faucet handle;
a water outlet pipe;
wherein, a base seat and the valve core of claim 1 are disposed inside the faucet housing, the faucet handle is connected to the valve handle;
the valve housing is connected to the base seat, the base seat has a first initial water inlet channel, a second initial water inlet channel, a total water outlet channel, a first transition water outlet channel and a second transition water outlet channel, the first transition water outlet channel and a second transition water outlet channel are disposed isolated with each other;

the first initial water inlet channel communicates with the cold water inlet channel, the second initial water inlet channel communicates with the hot water inlet channel, the second transition water outlet channel always communicates with the total water outlet channel and the second water outlet channel, the first water outlet channel communicates with the first transition outlet channel;

an electric control switch used for controlling the communication of the first transition water outlet channel and the total water outlet channel is disposed between the first transition water outlet channel and the total water outlet channel.

12. The pull-out faucet of claim 11, wherein ends of the total water outlet channel, the first initial water inlet channel and the second initial water inlet channel are all located at a bottom of the base seat facing downward;

the electric control switch is disposed at a top of the base seat, the water outlet pipe has a first end and a second end, the first end of the water outlet pipe is connected to an end of the total water outlet channel, the second end of the water outlet pipe extends upward and is connected to the water outlet nozzle above the base seat;

a control module is disposed inside the faucet housing, the electric control switch is connected to the control module which has a sensing portion exposed out of the faucet housing.

13. The pull-out faucet of claim 11, wherein the base seat further has a guide slot for allowing the water outlet pipe to pass through;

the faucet housing comprises a base housing fixed to a basin and a guide pipe inserted on the base housing, the base seat, the control module and the valve core are disposed in the base housing, and, the water outlet nozzle is detachably connected to a front end of the guide pipe.

14. The pull-out faucet of claim 11, wherein the base seat has a mounting cavity for the electric control switch to be mounted inside;

a valve port is disposed between the first transition water outlet channel and the total water outlet channel, the electric switch blocks the valve port in a normal state to separate the first transmission water outlet channel and the total water outlet channel, and, when powered on, the electric control switch opens the valve port so that the first transition water outlet channel communicates with the total water outlet channel.

* * * * *